United States Patent
White et al.

(10) Patent No.: US 10,152,352 B2
(45) Date of Patent: Dec. 11, 2018

(54) WRITING TO CONTIGUOUS MEMORY ADDRESSES IN A NETWORK ON A CHIP ARCHITECTURE

(71) Applicant: Friday Harbor LLC, New York, NY (US)

(72) Inventors: Andy White, Austin, TX (US); Doug Meyer, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 255 days.

(21) Appl. No.: 14/943,993

(22) Filed: Nov. 17, 2015

(65) Prior Publication Data

US 2017/0139644 A1 May 18, 2017

(51) Int. Cl.
*G06F 12/02* (2006.01)
*G06F 9/50* (2006.01)
*G06F 15/167* (2006.01)
*G06F 15/173* (2006.01)

(52) U.S. Cl.
CPC .............. *G06F 9/50* (2013.01); *G06F 9/5016* (2013.01); *G06F 12/0246* (2013.01); *G06F 15/167* (2013.01); *G06F 15/17362* (2013.01)

(58) Field of Classification Search
None
See application file for complete search history.

(56) References Cited

U.S. PATENT DOCUMENTS

| | | | |
|---|---|---|---|
| 4,809,156 A * | 2/1989 | Taber | G06F 7/48 711/217 |
| 8,655,815 B2 | 2/2014 | Palmer | |
| 8,848,726 B1 | 9/2014 | Palmer | |
| 2001/0048681 A1* | 12/2001 | Bilic | H04L 29/06 370/389 |
| 2006/0181921 A1* | 8/2006 | Chu | G11C 11/413 365/154 |
| 2014/0032457 A1 | 1/2014 | Palmer | |
| 2014/0156907 A1 | 6/2014 | Palmer | |
| 2014/0204943 A1 | 7/2014 | Palmer | |
| 2014/0208024 A1* | 7/2014 | Simionescu | G06F 3/061 711/114 |
| 2015/0234747 A1* | 8/2015 | Tanaka | G06F 12/0875 711/125 |

* cited by examiner

*Primary Examiner* — Charles Rones
*Assistant Examiner* — Ryan Dare
(74) *Attorney, Agent, or Firm* — Sheppard Mullin Richter & Hampton LLP

(57) ABSTRACT

Devices, systems and methods are provided for writing, by a plurality of computing resources, to contiguous memory addresses of memory that supports random access, without having to specify actual write addresses of the memory.

20 Claims, 14 Drawing Sheets

WRITING TO CONTIGUOUS MEMORY ADDRESSES IN A NETWORK ON A CHIP ARCHITECTURE

FIELD OF THE DISCLOSURE

The systems, methods and apparatuses described herein relate to writing to memory in a computing system that has a plurality of computing resources, where communication between the computing resources is carried out based on a network on a chip architecture, e.g., by writing to contiguous memory addresses of a memory that supports random access.

BACKGROUND

In a network on a chip device, a plurality of processing elements write data to memory that supports random access by sending a write packet to a memory controller of the memory, where each of the write packets includes respective write data and a respective memory address where the write data is to be written, also referred to as a write address. In order for write data to be written by a processing element to the memory in an aggregated manner, a memory address that is currently available for writing—i.e., one that is contiguous to the last used memory address to which other write data has been previously written—must be known by the processing element at the time when it transmits to the memory controller a write packet with the write data. The last used memory address to which the other write data had been previously written can be obtained by the processing element through a notification sent by the memory controller or by another processing element that has written the other write data to the last used memory address.

SUMMARY

In this specification, technologies are disclosed for writing, by a plurality of computing resources, to contiguous memory addresses of memory that supports random access, without having to specify actual write addresses of the memory. The computing resources can be part of a computing system in which communication between the computing resources is carried out based on a network on a chip architecture. In accordance with the disclosed technologies, a memory address space associated with the memory includes a plurality of memory regions, where each memory region includes multiple contiguous memory addresses of the memory address space. In this case, a memory controller associated with the memory is configured to (1) receive write packets from different computing resources of the computing system, each write packet specifying only a memory region (as opposed to a specific write address) where write data included in the write packet is to be written, and (2) write the write data included in the received write packets to contiguous (also referred to as consecutive) memory addresses of the specified memory regions.

Particular aspects of the disclosed technologies can be implemented so as to realize one or more of the following potential advantages. For example, when sorting a list, although the order in which the data is written to a region of memory that supports random access is unimportant, it would be advantageous for the data to be packed, or contiguously written, in the region of memory. As such, performing the disclosed aggregate writing can be effectively used when multiple computing resources (e.g., processing engines) of a computing system, e.g., when coordinating to perform a task using parallel processing, have to write data (e.g., to be later sorted) to the same region of memory, without needing to specify actual write addresses in the region of memory. Conventionally, each computing resource would need to determine, at the time of writing, each write address it could use in the region of memory. Moreover, in accordance with the disclosed aggregate writing, the memory need not be partitioned such that each computing resource is assigned a block of memory of the memory region to which data is to be written by the computing resource in a contiguous manner. Eliminating the need to partition memory allows each computing resource to write, if necessary, more data than if it were assigned a dedicated block of memory, which necessarily has a limited capacity. In this manner, computing resources of the computing system can beneficially avoid having to perform "dry runs" of their respective processes to calculate the amount of data each computing resource will need to write to memory, and then adjust the memory partitions, and re-run the processes with actual data. Further in accordance with the disclosed aggregate writing, multiple computing resources can write to a region of the memory in a non-serialized manner, because the computing resources need not request their respective "next write addresses" from a memory manager authority, e.g., a memory controller, a CPU or an operating system.

Details of one or more implementations of the disclosed technologies are set forth in the accompanying drawings and the description below. Other features, aspects, descriptions and potential advantages will become apparent from the description, the drawings and the claims.

Figure 1A:
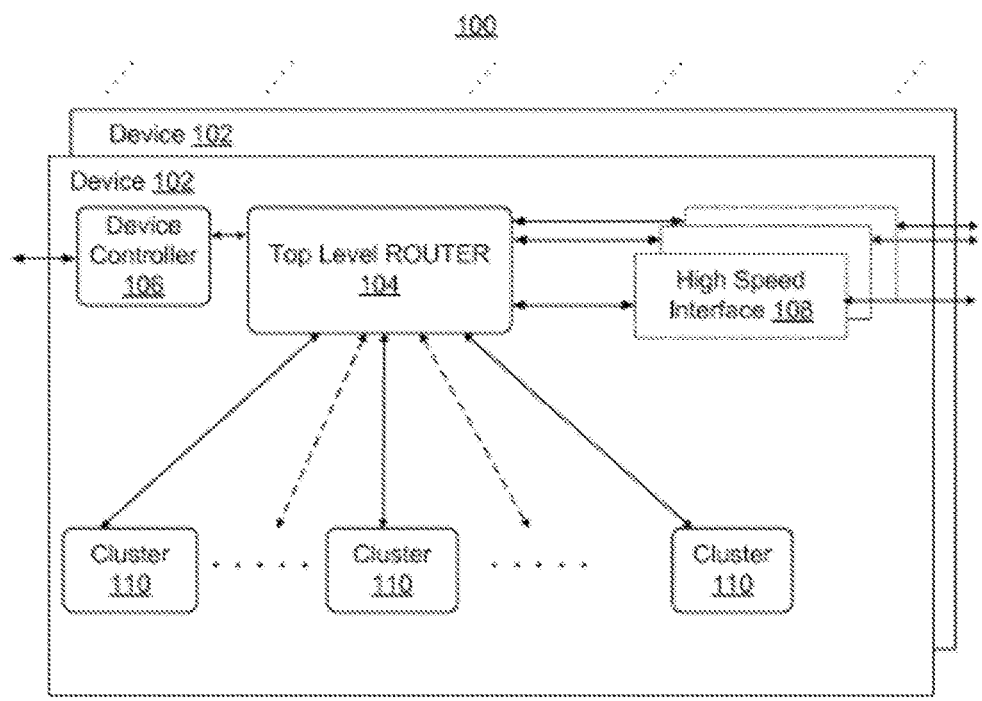
FIG. 1A is a block diagram of an example of a computing system.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Technologies are described for writing, by a plurality of computing resources, to contiguous memory addresses of a memory that supports random access, without having to specify actual, specific write addresses of the memory. The computing resources can be part of a computing system in which communication between the computing resources is carried out based on a network on a chip architecture. In accordance with the disclosed technologies, a memory address space associated with the memory includes a plurality of memory regions, where each memory region includes multiple contiguous memory addresses of the memory address space, e.g., monotonically ascending programmable logic (PL) double data rate type three (DDR3) longword locations. A memory controller associated with the memory includes, for each memory region of the memory, a first register that stores first address data specifying the memory region, and a second register that stores second address data corresponding to a current memory address of the specified memory region, the current memory address being contiguous with a previously written memory address of the specified memory region. Here, the memory controller is configured to (1) receive aggregate write (AW) packets (each AW packet including one or more PL DDR3 longwords of data) from different computing resources of the computing system, each AW packet specifying only a memory region where write data included in the AW packet is to be written (as opposed to a specific memory address), and (2) write, in the order that the AW packets have been received, the write data in the received AW packets to consecutive memory addresses of the specified memory region. Note that the writing is performed by the memory controller based on the first address data stored in the first register (corresponding to the specified memory region) and the second address data stored in the second register (corresponding to the current write address in specified memory region).

In some implementations, each memory region is specified in an AW packet as a base memory address of the memory region, such that the base memory addresses collectively cover the entire PL DDR3 memory address space. For example, the first address data stored in the first register corresponding to the memory region may be the base memory address of the memory region. The base memory address of the memory region can be a first physical address to which write data will be written in the memory region of the PL DDR3 memory. Moreover, the second address data in the second register corresponding to a current memory address of each memory region is incremented after each write operation performed by the memory controller to the next contiguous memory address of the memory region. In this manner, write data received with the next AW packet will be written by the memory controller to a write address of the specified memory region immediately after a write address where the last of the write data in a previous AW packet was written by the memory controller.

Prior to describing example implementations of aggregate writing used by computing resources of a computing system, where communication between the computing resources is carried out based on network on a chip architecture, structural aspects and functional aspects of the computing system and of the computing resources are described first.

FIG. 1A shows an exemplary computing system 100 according to the present disclosure. The computing system 100 includes at least one processing device 102. A typical computing system 100, however, may include a plurality of processing devices 102. In some implementations, each processing device 102, which may also be referred to as device 102, includes a router 104, a device controller 106, a plurality of high speed interfaces 108 and a plurality of clusters 110. The router 104 may also be referred to as a top level router or a level one router. Each cluster 110 includes a plurality of processing engines to provide computational capabilities for the computing system 100. In some implementations, the high speed interfaces 108 include communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 includes 2, 4, 8, 16, 32 or another number of high speed interfaces 108. Each high speed interface 108 may implement a physical communication protocol. For example, each high speed interface 108 implements the media access control (MAC) protocol, and thus may have a unique MAC address associated with it. The physical communication may be implemented in a known communication technology, for example, Gigabit Ethernet, or any other existing or future-developed communication technology. For example, each high speed interface 108 implements bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair including one high speed interface 108 on one processing device 102 and another high speed interface 108 on the other processing device 102.

Figure 5:
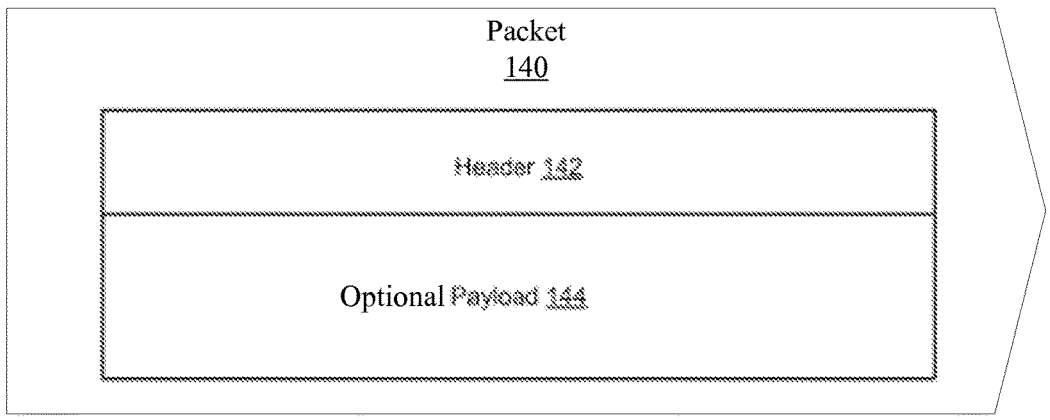
FIG. 5 is a block diagram of an example of a packet used to address a computing resource of a computing system.

In accordance with network on a chip architecture, data communication between different computing resources of the computing system 100 is implemented using routable packets. The computing resources include device level resources such as a device controller 106, cluster level resources such as a cluster controller or cluster memory controller, and/or the processing engine level resources such as individual processing engines and/or individual processing engine memory controllers. An example of a routable packet 140 (or simply packet 140) is shown in FIG. 5. The packet 140 includes a header 142. Optionally, the packet also includes a payload 144. The header 142 includes a routable destination address for the packet 140. The router 104 may be a top-most router configured to route packets on each processing device 102. In some implementations, the router 104 is a programmable router. That is, the routing information used by the router 104 may be programmed and updated. In some cases, the router 104 is implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

In some implementations, the device controller 106 controls the operation of the processing device 102 from power on through power down. In some implementations, the device controller 106 includes a device controller processor, one or more registers and a device controller memory space. The device controller processor may be any existing or future-developed microcontroller. In some implementations, for example, an ARM® Cortex M0 microcontroller is used for its small footprint and low power consumption. In other implementations, a bigger and more powerful microcontroller is chosen if needed. The one or more registers include one to hold a device identifier (DEVID) for the processing device 102 after the processing device 102 is powered up. The DEVID is used to uniquely identify the processing device 102 in the computing system 100. In some implementations, the DEVID is loaded on system start from a non-volatile storage, for example, a non-volatile internal storage on the processing device 102 or a non-volatile external storage. The device controller memory space may include both read-only memory (ROM) and random access memory (RAM). In some implementations, the ROM may store bootloader code that during a system start is executed to initialize the processing device 102 and load the remainder of the boot code through a bus from outside of the device controller 106. In some implementations, the instructions for the device controller processor, also referred to as the firmware, reside in the RAM after they are loaded during the system start.

Here, the registers and device controller memory space of the device controller 106 are read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet includes a destination address such as DEVID:PADDR, of which the DEVID may identify the processing device 102 and the PADDR may be an address for a register of the device controller 106 or a memory location of the device controller memory space of a processing device 102. In some implementations, a packet directed to the device controller 106 has a packet operation code, which may be referred to as packet opcode or just opcode, to indicate what operation needs to be performed for the packet. For example, the packet operation code may indicate reading from or writing to the storage location pointed to by PADDR. It should be noted that the device controller 106 also sends packets in addition to receiving them. The packets sent by the device controller 106 may be self-initiated or in response to a received packet (e.g., a read request). Self-initiated packets include, for example, reporting status information, requesting data, etc.

Figure 1B:
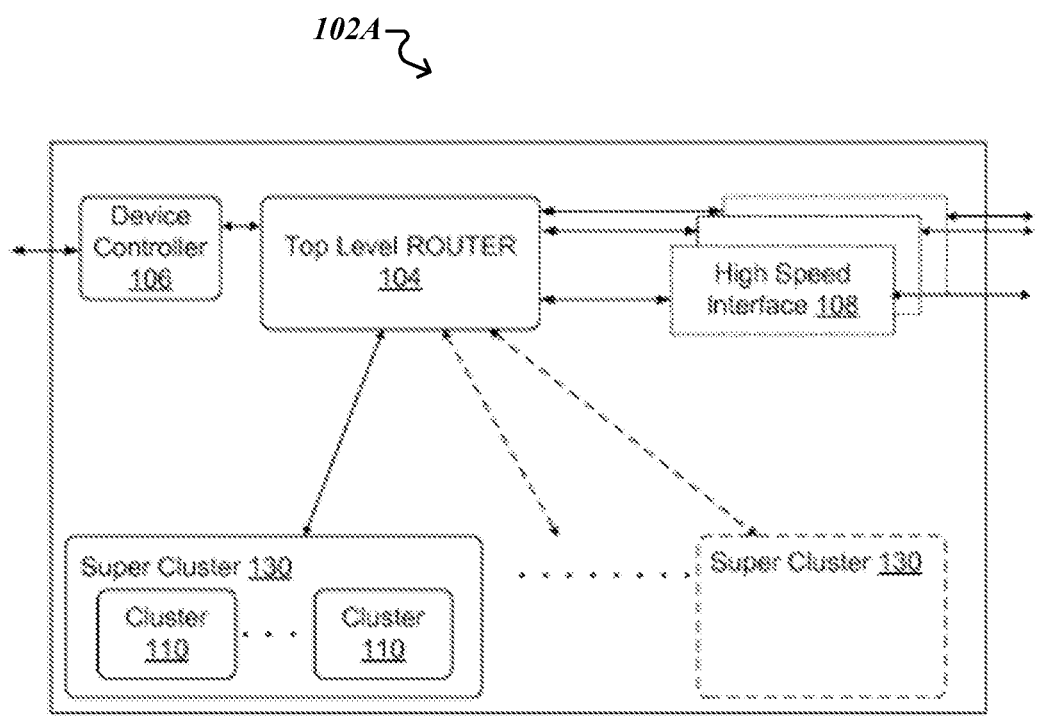
FIG. 1B is a block diagram of an example of a processing device of a computing system.

In some implementations, a plurality of clusters 110 on a processing device 102 are grouped together. FIG. 1B shows a block diagram of another example of a processing device 102A of the computing system 100. The example processing device 102A is one particular embodiment of the processing device 102. Therefore, the processing device 102 referred to in the present disclosure may include any embodiments of the processing device 102, including the example processing device 102A. As shown on FIG. 1B, a plurality of clusters 110 may be grouped together to form a super cluster 130 and the example of processing device 102A may include a plurality of such super clusters 130. In some implementations, a processing device 102 includes 2, 4, 8, 16, 32 or another number of clusters 110, without further grouping the clusters 110 into super clusters. In other implementations, a processing device 102 may include 2, 4, 8, 16, 32 or another number of super clusters 130 and each super cluster 130 may comprise a plurality of clusters.

Figure 2A:
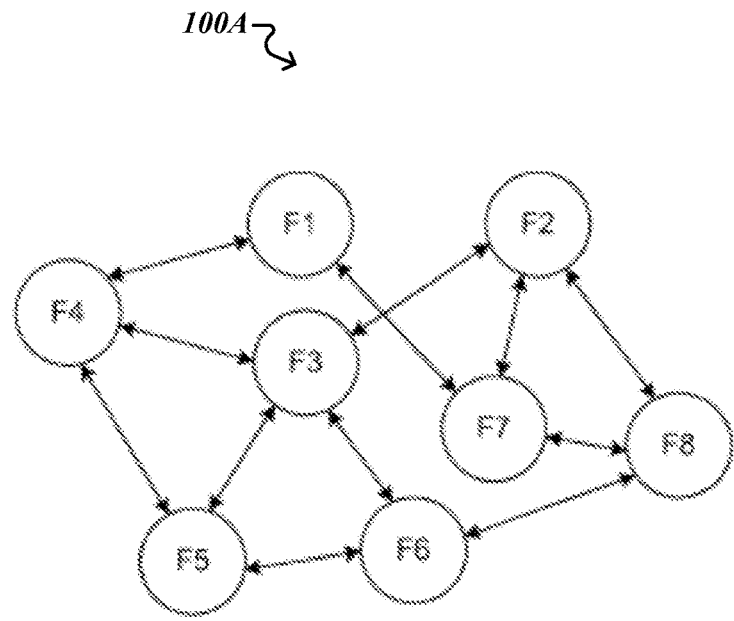
FIG. 2A is a block diagram of topology of connections of an example of a computing system.

FIG. 2A shows a block diagram of an example of a computing system 100A. The computing system 100A may be one example implementation of the computing system 100 of FIG. 1A. The computing system 100A includes a plurality of processing devices 102 designated as F1, F2, F3, F4, F5, F6, F7 and F8. As shown in FIG. 2A, each processing device 102 is directly coupled to one or more other processing devices 102. For example, F4 is directly coupled to F1, F3 and F5; and F7 is directly coupled to F1, F2 and F8. Within computing system 100A, one of the processing devices 102 may function as a host for the whole computing system 100A. In some implementations, the host has a unique device ID that every processing devices 102 in the computing system 100A recognizes as the host. Any of the processing devices 102 may be designated as the host for the computing system 100A. For example, F1 may be designated as the host and the device ID for F1 is set as the unique device ID for the host.

In other implementations, the host is a computing device of a different type, such as a computer processor (for example, an ARM® Cortex or Intel® x86 processor). Here, the host communicates with the rest of the system 100A through a communication interface, which represents itself to the rest of the system 100A as the host by having a device ID for the host.

The computing system 100A may implement any appropriate techniques to set the DEVIDs, including the unique DEVID for the host, to the respective processing devices 102 of the computing system 100A. In some implementations, the DEVIDs are stored in the ROM of the respective device controller 106 for each processing devices 102 and loaded into a register for the device controller 106 at power up. In other implementations, the DEVIDs are loaded from an external storage. Here, the assignments of DEVIDs may be performed offline (when there is no application running in the computing system 100A), and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change is controlled by the host of the computing system 100A. For example, after the initialization of the computing system 100A, which loads the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
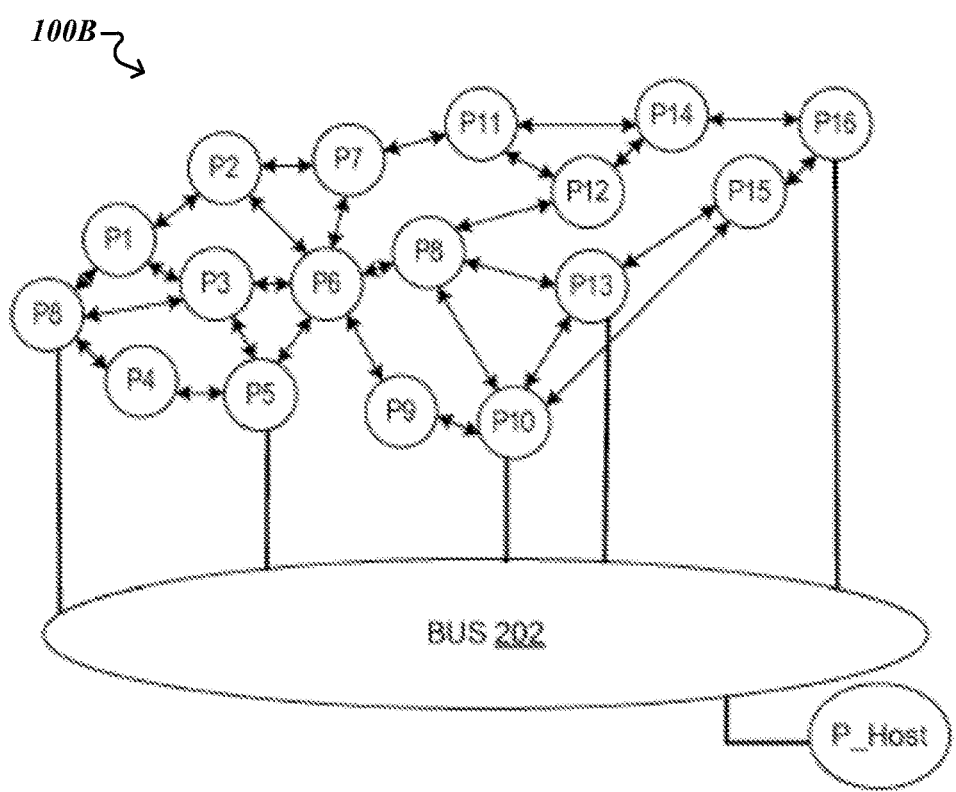
FIG. 2B is a block diagram of topology of connections of another example of a computing system.

FIG. 2B is a block diagram of a topology of another example of a computing system 100B. The computing system 100B is another example implementation of the computing system 100 of FIG. 1 and includes a plurality of processing devices 102 (designated as P1 through P16 on FIG. 2B), a bus 202 and a processing device P_Host. Each processing device of P1 through P16 is directly coupled to another processing device of P1 through P16 by a direct link between them. At least one of the processing devices P1 through P16 is coupled to the bus 202. In the example shown in FIG. 2B, the processing devices P8, P5, P10, P13, P15 and P16 are coupled to the bus 202. Here, the processing device P_Host is coupled to the bus 202 and is designated as the host for the computing system 100B. In the computing system 100B, the host may be a computer processor (for example, an ARM® Cortex or Intel® x86 processor). The host communicates with the rest of the computing system 100B through a communication interface coupled to the bus and represents itself to the rest of the system 100B as the host by having a device ID for the host.

Figure 3A:
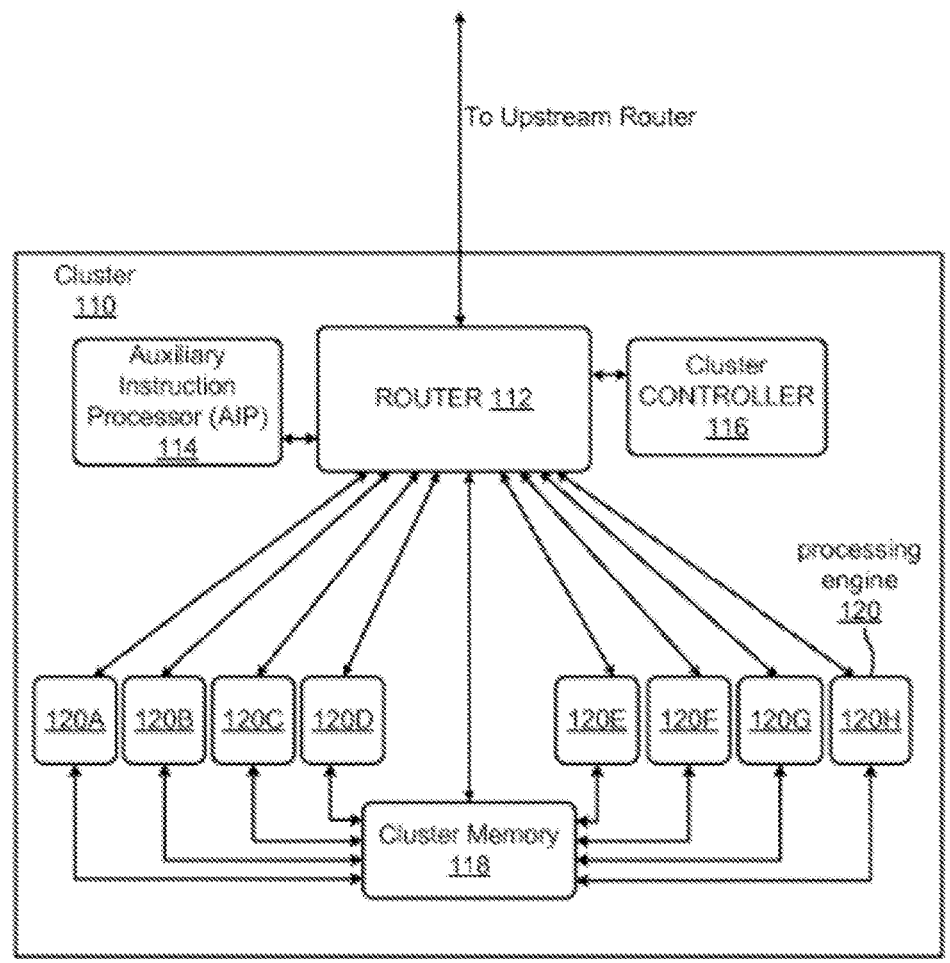
FIG. 3A is a block diagram of an example of a cluster of a computing device.

FIG. 3A shows a block diagram of an example of a cluster 110. The cluster 110 includes a router 112, a cluster controller 116, an auxiliary instruction processor (AIP) 114, a cluster memory 118 and a plurality of processing engines 120. The router 112 is coupled to an upstream router to provide interconnection between the upstream router and the cluster 110. The upstream router may be, for example, the router 104 of the processing device 102 if the cluster 110 is not part of a super cluster 130.

In accordance with network on a chip architecture, examples of operations to be performed by the router 112 include receiving a packet destined for a computing resource within the cluster 110 from outside the cluster 110 and/or transmitting a packet originating within the cluster 110 destined for a computing resource inside or outside the cluster 110. A computing resource within the cluster 110 may be, for example, the cluster memory 118 or any of the processing engines 120 within the cluster 110. A computing resource outside the cluster 110 may be, for example, a computing resource in another cluster 110 of the computer device 102, the device controller 106 of the processing device 102, or a computing resource on another processing device 102. In some implementations, the router 112 also transmits a packet to the router 104 even if the packet may target a resource within itself. In some cases, the router 104 implements a loopback path to send the packet back to the originating cluster 110 if the destination resource is within the cluster 110.

In some implementations, the cluster controller 116 sends packets, for example, as a response to a read request, or as unsolicited data sent by hardware for error or status report. The cluster controller 116 also receives packets, for example, packets with opcodes to read or write data. In some implementations, the cluster controller 116 is a microcontroller, for example, one of the ARM® Cortex-M microcontrollers and includes one or more cluster control registers (CCRs) that provide configuration and control of the cluster 110. In other implementations, instead of using a microcontroller, the cluster controller 116 is custom made to implement any functionalities for handling packets and controlling operation of the router 112. Here, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

In some implementations, each cluster memory 118 is part of the overall addressable memory of the computing system 100. That is, the addressable memory of the computing system 100 includes the cluster memories 118 of all clusters of all devices 102 of the computing system 100. The cluster memory 118 is a part of the main memory shared by the computing system 100. In some implementations, any memory location within the cluster memory 118 may be addressed by any processing engine within the computing system 100 by a physical address. In some implementations, the physical address is a combination of the DEVID, a cluster identifier (CLSID) and a physical address location (PADDR) within the cluster memory 118. As such, the physical address is formed as a string of bits, e.g., DEVID:CLSID:PADDR. The DEVID may be associated with the device controller 106 as described above and the CLSID may be a unique identifier to uniquely identify the cluster 110 within the local processing device 102. It should be noted that in at least some implementations, each register of the cluster controller 116 also be assigned a physical address (PADDR). Therefore, the physical address DEVID:CLSID:PADDR may also be used to address a register of the cluster controller 116, in which PADDR may be an address assigned to the register of the cluster controller 116.

In some other implementations, any memory location within the cluster memory 118 is addressed by any processing engine within the computing system 100 by a virtual address. The virtual address may be a combination of a DEVID, a CLSID and a virtual address location (ADDR). As such, the virtual address is formed as a string of bits, e.g., DEVID:CLSID:ADDR. The DEVID and CLSID in the virtual address may be the same as in the physical addresses.

In some cases, the width of ADDR is specified by system configuration. For example, the width of ADDR is loaded into a storage location convenient to the cluster memory 118 during system start and/or changed from time to time when the computing system 100 performs a system configuration. In some implementations, to convert the virtual address to a physical address, the value of ADDR is added to a base physical address value (BASE). The BASE may also be specified by system configuration as the width of ADDR and stored in a location convenient to a memory controller of the cluster memory 118. In one example, the width of ADDR is stored in a first register and the BASE is stored in a second register in the memory controller. Thus, the virtual address DEVID:CLSID:ADDR is converted to a physical address as DEVID:CLSID:ADDR+BASE. Note that the result of ADDR+BASE has the same width as the target physical address.

The address in the computing system 100 may be 8 bits, 16 bits, 32 bits, 64 bits, or any other number of bits wide. In some implementations, the address is 32 bits wide. The DEVID may be 10, 15, 20, 25 or any other number of bits wide. The width of the DEVID is chosen based on the size of the computing system 100, for example, how many processing devices 102 the computing system 100 has or is designed to have. In some implementations, the DEVID is 20 bits wide and the computing system 100 using this width of DEVID contains up to $2^{20}$ processing devices 102. The width of the CLSID is chosen based on how many clusters 110 the processing device 102 is designed to have. For example, the CLSID may be 3, 4, 5, 6, 7, 8 bits or any other number of bits wide. In some implementations, the CLSID is 5 bits wide and the processing device 102 using this width of CLSID contains up to $2^5$ clusters. The width of the PADDR for the cluster level may be 20, 30 or any other number of bits. For example, the PADDR for the cluster level is 27 bits and the cluster 110 using this width of PADDR contains up to $2^{27}$ memory locations and/or addressable registers. Therefore, in some implementations, if the DEVID is 20 bits wide, CLSID is 5 bits and PADDR has a width of 27 bits, then a physical address DEVID: CLSID:PADDR or DEVID:CLSID:ADDR+BASE is 52 bits.

For performing the virtual to physical memory conversion, the first register (ADDR register) may have 4, 5, 6, 7 bits or any other number of bits. In some implementations, the first register is 5 bits wide. If the value of the 5 bits register is four (4), the width of ADDR is 4 bits; and if the value of 5 bits register is eight (8), the width of ADDR will be 8 bits. Regardless of ADDR being 4 bits or 8 bits wide, if the PADDR for the cluster level is 27 bits, then BASE is 27 bits, and the result of ADDR+BASE still is a 27 bits physical address within the cluster memory 118.

In the example illustrated in FIG. 3A, a cluster 110 includes one cluster memory 118. In other examples, a cluster 110 includes a plurality of cluster memories 118 that each includes a memory controller and a plurality of memory banks, respectively. Moreover, in yet another example, a cluster 110 includes a plurality of cluster memories 118 and these cluster memories 118 are connected together via a router that are downstream of the router 112.

The AIP 114 is a special processing engine shared by all processing engines 120 of one cluster 110. In some implementations, the AIP 114 is implemented as a coprocessor to the processing engines 120. For example, the AIP 114 implements less commonly used instructions such as some floating point arithmetic, including but not limited to, one or more of addition, subtraction, multiplication, division and square root, etc. In the example shown in FIG. 3A, the AIP 114 is coupled to the router 112 directly and is configured to send and receive packets via the router 112. As a coprocessor to the processing engines 120 within the same cluster 110, although not shown in FIG. 3A, the AIP 114 may also be coupled to each processing engines 120 within the same cluster 110 directly. In other implementations, a bus shared by all the processing engines 120 within the same cluster 110 is used for communication between the AIP 114 and all the processing engines 120 within the same cluster 110. In some other implementations, a multiplexer is used to control access to the bus shared by all the processing engines 120 within the same cluster 110 for communication with the AIP 114. In yet other implementations, a multiplexer is used to control communication between the AIP 114 and all the processing engines 120 within the same cluster 110.

Figure 3B:
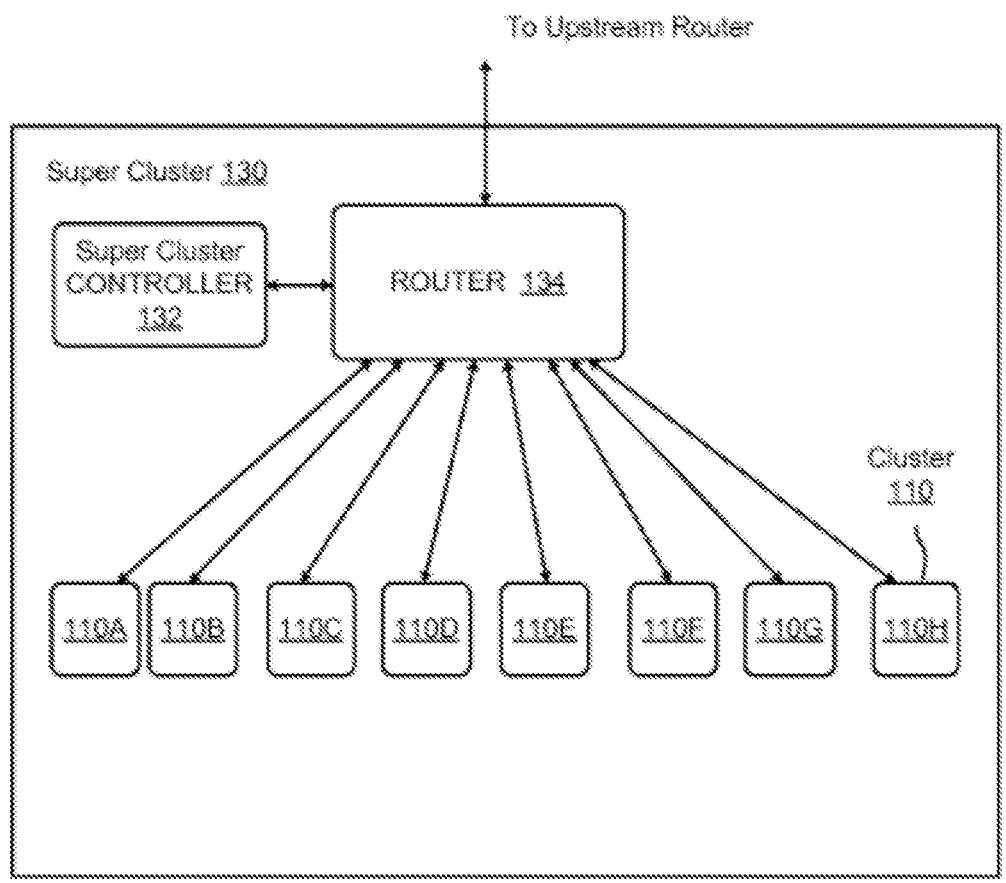
FIG. 3B is a block diagram of an example of a super cluster of a computing device.

The grouping of the processing engines 120 on a computing device 102 may have a hierarchy with multiple levels. For example, multiple clusters 110 are grouped together to form a super cluster. FIG. 3B is a block diagram of an example of a super cluster 130 of the computing device 102. In the example shown in FIG. 3B, a plurality of clusters 110A through 110H are grouped into the super cluster 130. Although 8 clusters are shown in the super cluster 130 on FIG. 3B, the super cluster 130 may include 2, 4, 8, 16, 32 or another number of clusters 110. The super cluster 130 includes a router 134 and a super cluster controller 132, in addition to the plurality of clusters 110. The router 134 is configured to route packets among the clusters 110 and the super cluster controller 132 within the super cluster 130, and to and from computing resources outside the super cluster 130 via a link to an upstream router. In implementations in which the super cluster 130 is used in a processing device 102A, the upstream router for the router 134 is the top level router 104 of the processing device 102A and the router 134 is an upstream router for the router 112 within the cluster 110. In some implementations, the super cluster controller 132 may be configured to implement CCRs, receive and send packets, and implement a fixed-purpose state machine encapsulating packets and memory access to the CCRs. In some cases, the super cluster controller 132 is implemented similar to the way the cluster controller 116 is implemented in a cluster 110. In other implementations, the super cluster 130 is implemented with just the router 134 and does not have a super cluster controller 132.

As noted above, a cluster 110 may include 2, 4, 8, 16, 32 or another number of processing engines 120. FIG. 3A shows an example of a plurality of processing engines 120 that have been grouped into a cluster 110, and FIG. 3B shows an example of a plurality of clusters 110 that have been grouped into a super cluster 130. Grouping of processing engines is not limited to clusters or super clusters. In some implementations, more than two levels of grouping is implemented and each level has its own router and controller.

Figure 4:
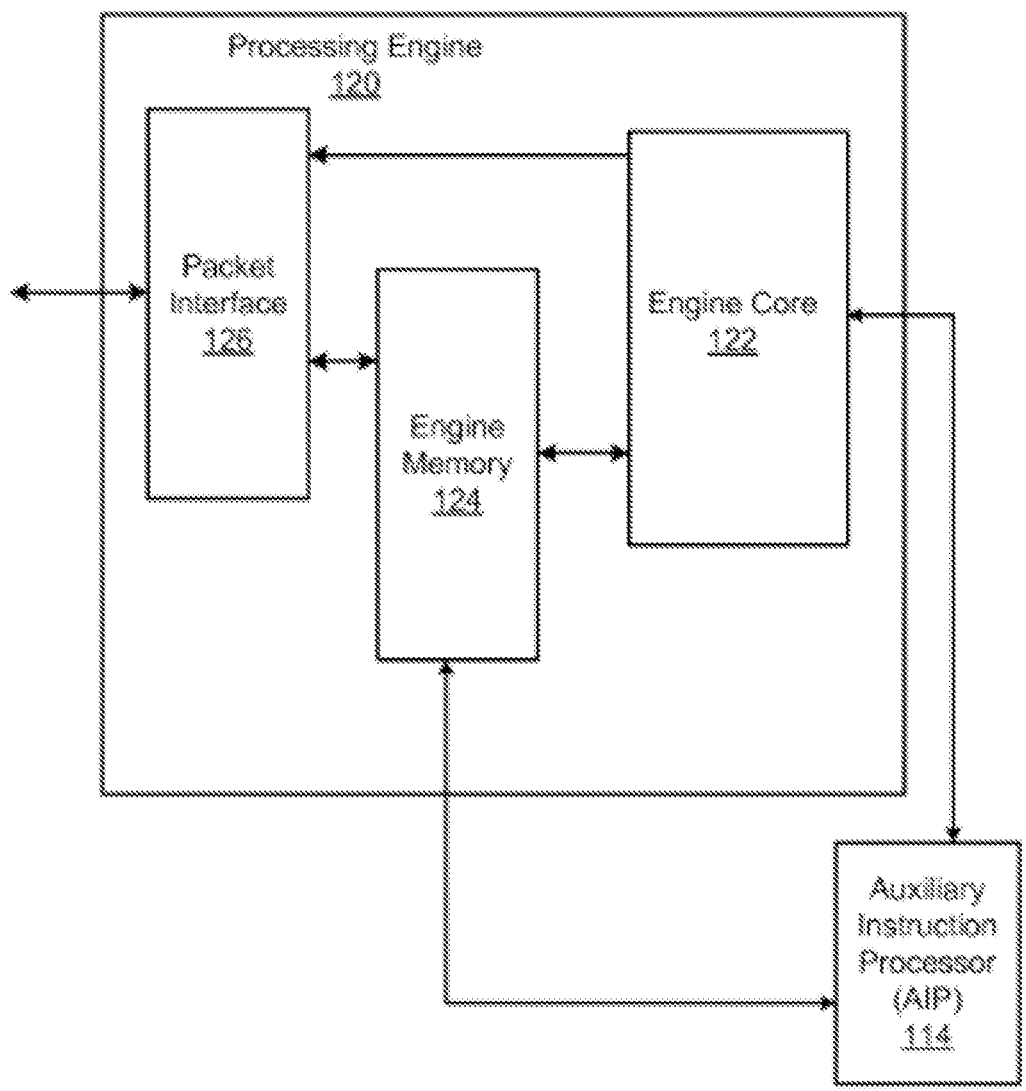
FIG. 4 is a block diagram of an example of a processing engine of a cluster.

FIG. 4 shows a block diagram of an example of a processing engine 120 of a processing device 102. In the example shown in FIG. 4, the processing engine 120 includes an engine core 122, an engine memory 124 and a packet interface 126. Here, the processing engine 120 is directly coupled to an AIP 114. As described above, the AIP 114 may be shared by all processing engines 120 within a cluster 110. In some implementations, the processing core 122 is a central processing unit (CPU) with an instruction set and implements some or all features of modern CPUs, such as, for example, a multi-stage instruction pipeline, one or more arithmetic logic units (ALUs), one or more floating point units (FPUs) or any other CPU technology. The instruction set includes one instruction set for the ALU to perform arithmetic and logic operations, and another instruction set for the FPU to perform floating point operations. In some cases, the FPU is a completely separate execution unit containing a multi-stage, single-precision floating point pipeline. When an FPU instruction reaches the instruction pipeline of the processing engine 120, the instruction and its source operand(s) are dispatched to the FPU.

The instructions of the instruction set may implement the arithmetic and logic operations and the floating point operations, such as those in the INTEL® x86 instruction set, using a syntax similar or different from the x86 instructions. In some implementations, the instruction set includes customized instructions. For example, one or more instructions are implemented according to the features of the computing system 100 and in accordance with network on a chip architecture. In one example, one or more instructions cause the processing engine executing the instructions to generate packets directly with system wide addressing. In another example, one or more instructions have a memory address located anywhere in the computing system 100 as an operand. In the latter example, a memory controller of the processing engine executing the instruction generates packets according to the memory address being accessed.

The engine memory 124 includes a program memory, a register file including one or more general purpose registers, one or more special registers and one or more events registers. In some implementations, the program memory is a physical memory for storing instructions to be executed by the processing core 122 and data to be operated upon by the instructions. In some cases, portions of the program memory are disabled and powered down for energy savings. For example, a top half or a bottom half of the program memory is disabled to save energy when executing a program small enough that half or less of the storage may be needed. The size of the program memory may be 1 thousand (1K), 2K, 3K, 4K, or any other number of storage units. The register file may include 128, 256, 512, 1024, or any other number of storage units. In some implementations, the storage unit is 32-bit wide, which may be referred to as a longword, and the program memory includes 2K 32-bit longwords and the register file includes 256 32-bit registers.

In some implementations, the register file includes one or more general purpose registers and special registers for the processing core 122. The general purpose registers serve functions that are similar or identical to the general purpose registers of an x86 architecture CPU. The special registers are used for configuration, control and/or status, for instance. Examples of special registers include one or more of the following registers: a next program counter, which may be used to point to the program memory address where the next instruction to be executed by the processing core 122 is stored; and a device identifier (DEVID) register storing the DEVID of the processing device 102.

In some implementations, the register file is implemented in two banks—one bank for odd addresses and one bank for even addresses—to permit multiple fast accesses during operand fetching and storing. The even and odd banks are selected based on the least-significant bit of the register address if the computing system 100 is implemented in little endian or on the most-significant bit of the register address if the computing system 100 is implemented in big-endian.

In some implementations, the engine memory 124 is part of the addressable memory space of the computing system 100. That is, any storage location of the program memory, any general purpose register of the register file, any special register of the plurality of special registers and any event register of the plurality of events registers is assigned a memory address PADDR. Each processing engine 120 on a processing device 102 is assigned an engine identifier (ENGINE ID), therefore, to access the engine memory 124, any addressable location of the engine memory 124 may be addressed by DEVID:CLSID:ENGINE ID:PADDR. In some cases, a packet addressed to an engine level memory location includes an address formed as DEVID:CLSID: ENGINE ID:EVENTS:PADDR, in which EVENTS is one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits are separate from the physical address being accessed.

In accordance with network on a chip architecture, the packet interface 126 includes a communication port for communicating packets of data. The communication port is coupled to the router 112 and the cluster memory 118 of the local cluster. For any received packets, the packet interface 126 directly passes them through to the engine memory 124. In some cases, a processing device 102 implements two mechanisms to send a data packet to a processing engine 120. A first mechanism uses a data packet with a read or write packet opcode. This data packet is delivered to the packet interface 126 and handled by the packet interface 126 according to the packet opcode. Here, the packet interface 126 includes a buffer to hold a plurality of storage units, for example, 1K, 2K, 4K, or 8K or any other number. In a second mechanism, the engine memory 124 further includes a register region to provide a write-only, inbound data interface, which may be referred to a mailbox. In some implementations, the mailbox includes two storage units that each can hold one packet at a time. Here, the processing engine 120 has an event flag, which is set when a packet has arrived at the mailbox to alert the processing engine 120 to retrieve and process the arrived packet. While this packet is being processed, another packet may be received in the other storage unit, but any subsequent packets are buffered at the sender, for example, the router 112 or the cluster memory 118, or any intermediate buffers.

In various implementations, data request and delivery between different computing resources of the computing system 100 is implemented by packets. FIG. 5 illustrates a block diagram of an example of a packet 140 in accordance with network on a chip architecture. As shown in FIG. 5, the packet 140 includes a header 142 and an optional payload 144. The header 142 includes a single address field, a packet opcode (POP) field and a size field. The single address field indicates the address of the destination computing resource of the packet, which may be, for example, an address at a device controller level such as DEVID:PADDR, an address at a cluster level such as a physical address DEVID:CLSID: PADDR or a virtual address DEVID:CLSID:ADDR, or an address at a processing engine level such as DEVID:CLSID: ENGINE ID:PADDR or DEVID:CLSID:ENGINE ID:EVENTS:PADDR. The POP field may include a code to indicate an operation to be performed by the destination computing resource. Exemplary operations in the POP field may include read (to read data from the destination) and write (to write data (e.g., in the payload 144) to the destination).

In some implementations, examples of operations in the POP field further include bulk data transfer. For example, certain computing resources implement a direct memory access (DMA) feature. Examples of computing resources that implement DMA may include a cluster memory controller of each cluster memory 118, a memory controller of each engine memory 124, and a memory controller of each device controller 106. Any computing resource that implements the DMA may perform bulk data transfer to another computing resource using packets with a packet opcode for bulk data transfer.

In addition to bulk data transfer, the examples of operations in the POP field further include transmission of unsolicited data. For example, any computing resource may generate a status report or incur an error during operation, the status or error is reported to a destination using a packet with a packet opcode indicating that the payload 144 contains the source computing resource and the status or error data.

The POP field may be 2, 3, 4, 5 or any other number of bits wide. In some implementations, the width of the POP field is selected depending on the number of operations defined for packets in the computing system 100. Also, in some embodiments, a packet opcode value can have different meaning based on the type of the destination computing resource that receives it. For example, for a three-bit POP field, a value 001 may be defined as a read operation for a processing engine 120 but a write operation for a cluster memory 118.

In some implementations, the header 142 further includes an addressing mode field and an addressing level field. Here, the addressing mode field contains a value to indicate whether the single address field contains a physical address or a virtual address that may need to be converted to a physical address at a destination. Further here, the addressing level field contains a value to indicate whether the destination is at a device, cluster memory or processing engine level.

The payload 144 of the packet 140 is optional. If a particular packet 140 does not include a payload 144, the size field of the header 142 has a value of zero. In some implementations, the payload 144 of the packet 140 contains a return address. For example, if a packet is a read request, the return address for any data to be read may be contained in the payload 144.

Figure 6:
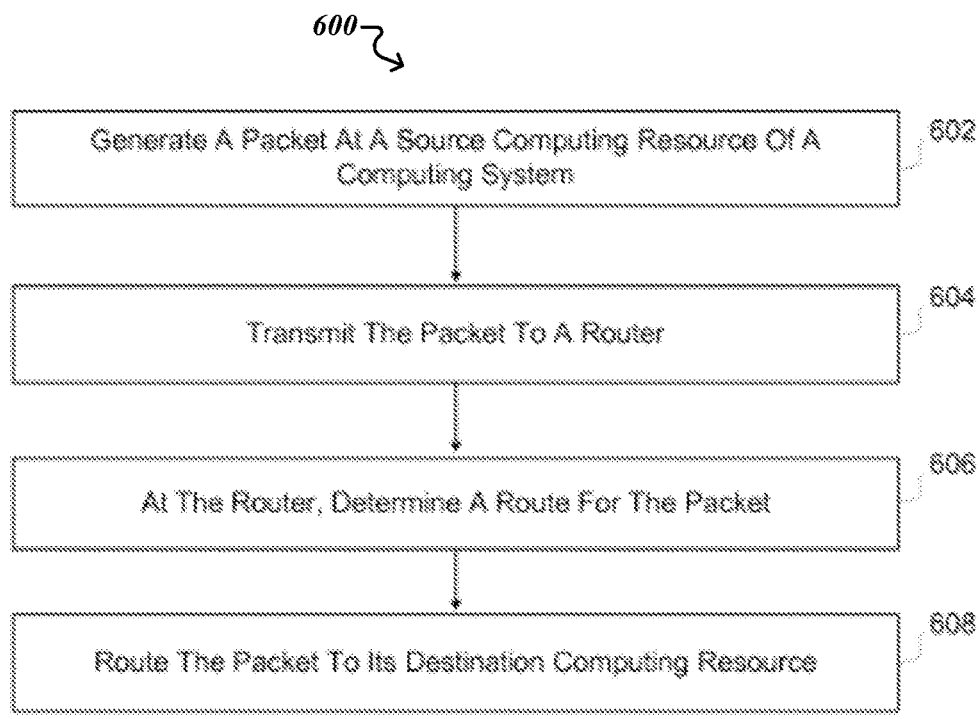
FIG. 6 is a flow diagram showing an example of a process of addressing a computing resource of a computing system using a packet.

FIG. 6 is a flow diagram showing an example of a process 600 of addressing a computing resource of a computing system using a packet in accordance with network on a chip architecture. An implementation of the computing system 100 may have one or more processing devices 102 configured to execute some or all of the operations of the process 600 in response to instructions stored electronically on an electronic storage medium. The one or more processing devices 102 include one or more devices configured through hardware, firmware, and/or software to execute one or more of the operations of the process 600.

The process 600 may start with block 602, at which a packet is generated at a source computing resource of the computing system 100. The source computing resource may be, for example, a device controller 106, a cluster controller 118, a super cluster controller 132 if a super cluster is implemented, an AIP 114, a memory controller for a cluster memory 118, or a processing engine 120. The generated packet may be the packet 140 described above in connection with FIG. 5. From block 602, the exemplary process 600 may continue to the block 604, where the packet is transmitted to an appropriate router based on the source computing resource that generated the packet. For example, if the source computing resource is a device controller 106, the generated packet is transmitted to a top level router 104 of the local processing device 102; if the source computing resource is a cluster controller 116, the generated packet is transmitted to a router 112 of the local cluster 110; if the source computing resource is a memory controller of the cluster memory 118, the generated packet is transmitted to a router 112 of the local cluster 110, or a router downstream of the router 112 if there are multiple cluster memories 118 coupled together by the router downstream of the router 112; and if the source computing resource is a processing engine 120, the generated packet is transmitted to a router of the local cluster 110 if the destination is outside the local cluster and to a memory controller of the cluster memory 118 of the local cluster 110 if the destination is within the local cluster.

At block 606, a route for the generated packet is determined at the router. As described above, the generated packet includes a header that includes a single destination address. The single destination address is any addressable location of a uniform memory space of the computing system 100. The uniform memory space is an addressable space that covers all memories and registers for each device controller, cluster controller, super cluster controller if a super cluster is implemented, cluster memory and processing engine of the computing system 100. In some cases, the addressable location is part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet determines the route for the generated packet based on the single destination address. At block 608, the generated packet is routed to its destination computing resource.

Figure 7A:
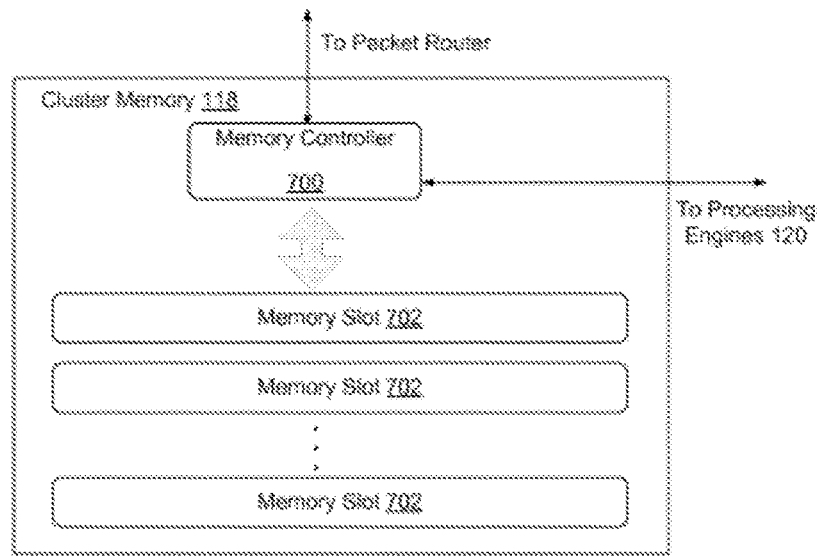
FIG. 7A is a block diagram of an example of a cluster memory.

FIG. 7A is a block diagram of an example of cluster memory 118 of a cluster of a computing device. The cluster memory 118 includes a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106.

In the example shown in FIG. 7A, the memory controller 700 is coupled to a packet router and to processing engines 120 via different data links. In implementations which have one cluster memory 118 within a cluster 110, the memory controller 700 is coupled to the router 112 of the cluster 110. The memory controller 700 may also be referred to as a smart memory controller because it implements two different access protocols: by packet access and direct memory access.

In some implementations, the data link between the memory controller 700 and a router is a packet-based data communication. The packet-based data communication uses packets as described above, e.g., such as the packet 140 shown in FIG. 5. In some implementations, the data link between the memory controller 700 and processing engines 120 is a direct data communication. Here, the processing engines 120 coupled to the memory controller 700 are the plurality of processing engines 120 within the same cluster 110 and the direct data communication includes memory access techniques. Examples of existing memory access technologies that may be used for the direct data communication between the memory controller 700 and the plurality of processing engines 120 within the cluster 110 include bus, crossbar, or any other existing memory access techniques for a network on a chip architecture.

The memory slots 702 are slots configured to receive memory banks and are configured for memories such as synchronous dynamic random-access memory (SDRAM), double data rate (DDR) SDRAM, DDR2 SDRAM, DDR3 SDRAM, or 3D RAM.

Figure 7B:
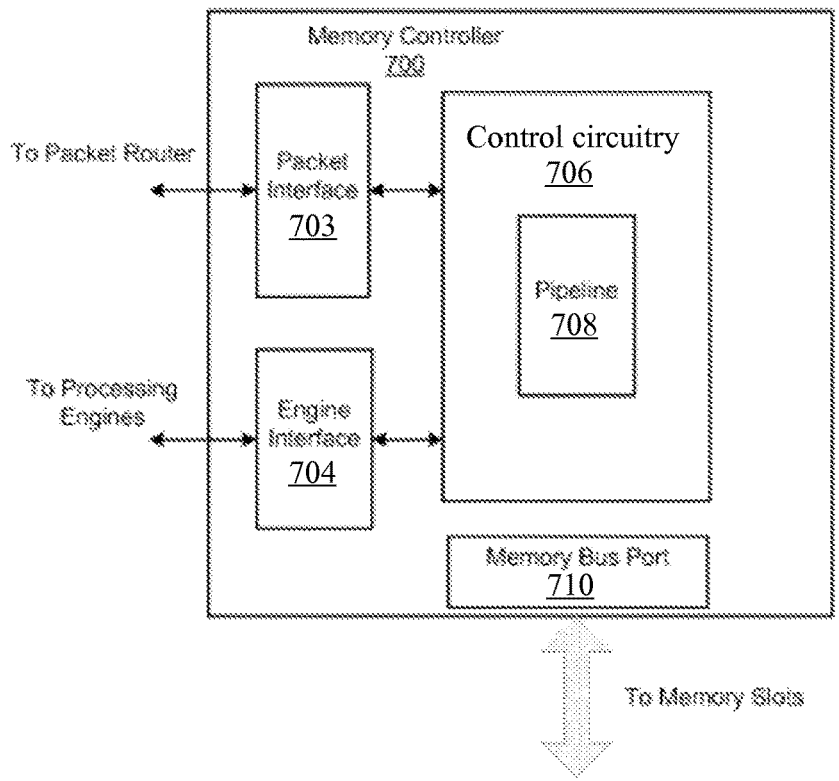
FIG. 7B is a block diagram of an example of a memory controller of a cluster memory.

FIG. 7B is a block diagram of an example memory controller 700 for a cluster memory 118. Here, the memory controller 700 includes a packet interface 703, an engine interface 704, control circuitry 706 and a memory bus port 710. The engine interface 704 is configured to support direct memory access by the processing engines 120 within the cluster 110. As such, the engine interface 704 implement part or all features of access technologies, such as but not limited to include bus, crossbar, or any other memory access techniques for a network on a chip architecture. The packet interface 703 includes hardware components configured to receive and transmit packets to a router. In some implementations, the packet interface 703 include a queue to buffer received packets and another queue to buffer packets to be sent. Once a packet is received at the packet interface 703, it is forwarded to the control circuitry 706 for processing. The memory bus port 710 is a data connection port configured to couple the memory controller 700 to the memory slots 702.

The control circuitry 706 (also referred to as controller core) is configured to decode a received packet, perform a memory operation (if required by the packet opcode), and generate a result packet (if necessary). For example, if a received packet has a packet opcode for a memory write, the control circuitry 706 extracts data from the received packet and writes the data to the memory bank at an address specified in the packet. Likewise, if a received packet has a packet opcode for a memory read, the control circuitry 706 reads data from the memory address specified in the packet, places the data in a new packet with a destination address specified in the read packet, and sends the new packet to the packet interface 703 to be queued for transmission. In some implementations, the control circuitry 706 has a structure similar to a typical CPU. For example, the control circuitry 706 includes an optional pipeline 708 to perform the steps of decoding the packet, performing the memory operation, and generating a result packet.

As noted above in this specification, multiple computing resources of the computing system 100, 100A, 100B often coordinate with each other when they have to write to contiguous memory addresses of memory. This can also be accomplished in a manner described below.

Figure 8A:
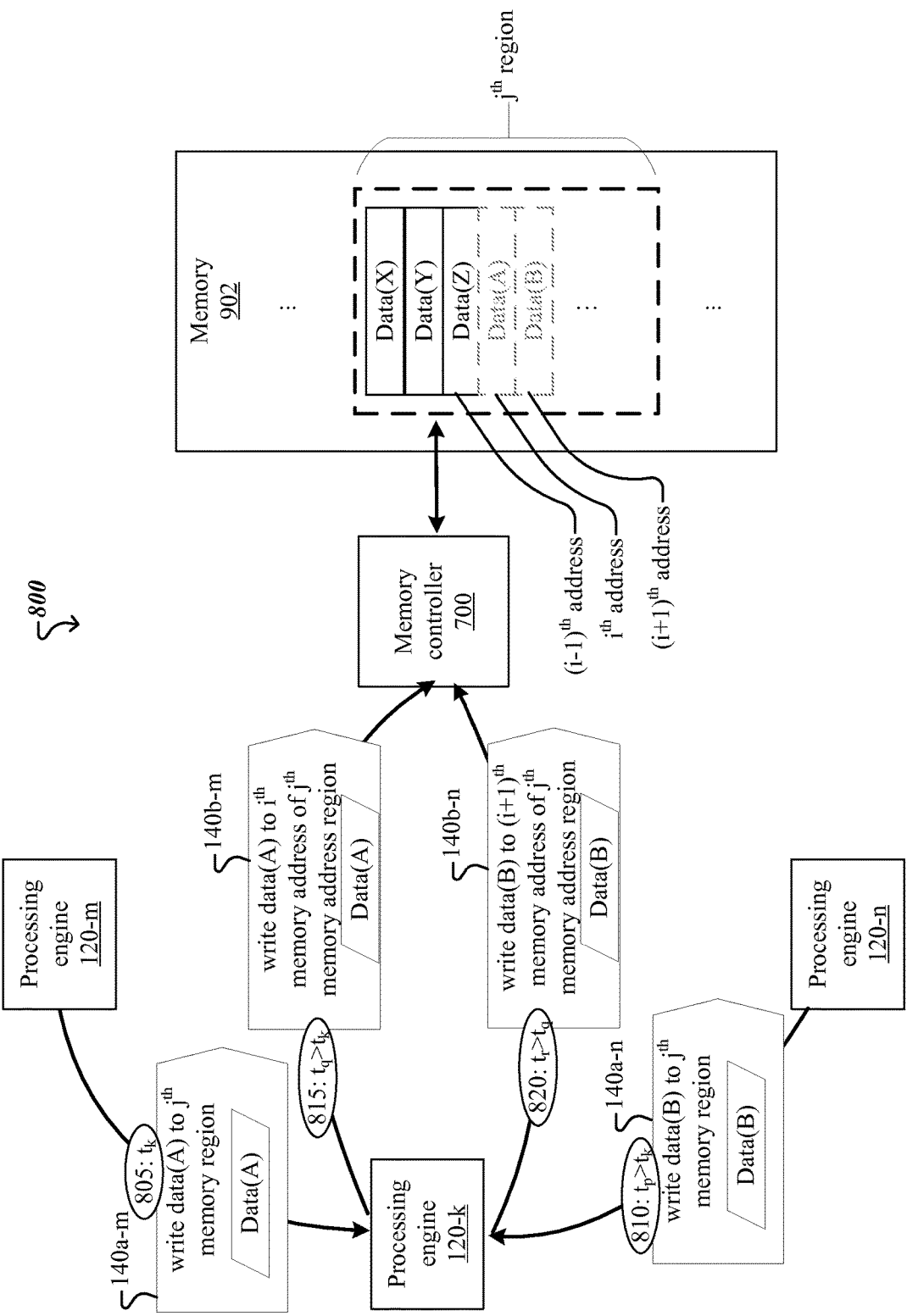
FIGS. 8A-8C show aspects of an example of a conventional aggregate write (AW) process used by a processing engine from among a plurality of processing engines to track availability of contiguous memory addresses of a memory and to write data received from other processing engines of the plurality to the memory, in an aggregate manner.

FIG. 8A shows aspects of an example of a conventional aggregate write process 800 used by a processing engine 120-$k$, that has been designated from among a plurality of processing engines to play the role of an aggregate writer. As such, the aggregate writer processing engine 120-$k$ tracks availability of contiguous memory addresses of a memory 902, and writes data—received from other processing engines 120-$m$, 120-$n$, etc. of the plurality—to the memory, in an aggregate manner. Note that the memory 902 supports random access and can be, e.g., random access memory (RAM), or solid state drive (SSD). Additionally, a memory address space of the memory 902 includes N memory regions, each memory region j, referred to simply as region (j), spanning contiguous memory addresses, where N≥2 and j=1 ... N.

In some implementations, the aggregate writer processing engine 120-$k$, the other two or more processing engines 120-$m$, 120-$n$, and a memory controller 700 associated with the memory 902 are part of a computing system like the computing system 100 described above in connection with FIG. 1A, the computing system 100A described above in connection with FIG. 2A, or the computing system 100B described above in connection with FIG. 2B. For instance, an example of a processing engine 120 has been described above in connection with FIG. 3A and FIG. 4, and an example of memory controller 700 has been described above in connection with FIGS. 7A-7B. In the example illustrated in FIG. 8A, the processing engines 120-$k$, 120-$m$ and 120-$n$ may be part of the same cluster (e.g., 110), or may be part of different clusters of the same processing device (e.g., 102) or of a different processing device. Moreover, the memory 902 with which the memory controller 700 is associated may be part of the same processing device or of a different processing device as the processing engines 120-$k$, 120-$m$ and 120-$n$. Multiple of each of chained-write packets (like the one shown in FIG. 8B) and write packets (like the one shown in FIG. 8C) are used to perform the conventional aggregate write process 800.

In reference with FIG. 8A, at 805 (corresponding to a time instance $t_k$), the aggregate writer processing engine 120-$k$ receives a first chained-write packet 140$a$-$m$ from a first originator processing engine 120-$m$. The first originator processing engine 120-$m$ uses the first chained-write packet 140$a$-$m$ to instruct the designated writer processing engine 120-$k$ to write data A (denoted data(A)) to region(j) of memory 902. Note that an actual memory address where data(A) is to be written in the memory 902 is not specified in the first chained-write packet 140$a$-$m$ transmitted by the first originator processing engine 120-$m$ to the designated writer processing engine 120-$k$.

At 810 (corresponding to a later time instance $t_p > t_k$), the aggregate writer processing engine 120-$k$ can receive a second chained-write packet 140$a$-$n$ from a second originator processing engine 120-$n$. The second originator processing engine 120-$n$ uses the second chained-write packet 140$a$-$n$ to instruct the designated writer processing engine 140$a$-$k$ to write data B (denoted data(B)) also to region(j) of memory 902. Note that an actual memory address where data(B) is to be written in the memory 902 is not specified in the second chained-write packet 140$a$-$n$ transmitted by the second originator processing engine 120-$n$ to the designated writer processing engine 120-$k$.

Moreover, for the use case illustrated in FIG. 8A, although each of the originator processing engines 120-$m$, 120-$n$ specifies that respective data(A), data(B) be written in region(j), it neither knows nor needs to know the exact memory address within region(j) where data(A), data(B) will be, or has been, written. Instead, it is the aggregate writer processing engine 120-$k$ that keeps track of the contiguous memory addresses where other data have been previously written in an aggregate manner, e.g., address(1), address(2), ... , address(i−1), for each region(j) of the memory 902. In this manner, the aggregate writer processing engine 120-$k$ knows that memory(i)—that is adjacent to memory(i−1) where other data, e.g., data(Z), has been previously written—is currently available to be written with data received from originator processing engines 120-$m$, 120-$n$. Additionally, because both the first chained-write packet 140$a$-$m$ and the second chained-write packet 140$a$-$n$ include data specifying instructions for the aggregate writer processing engine 120-$k$ to write respective data(A) and data(B) to the same region(j) of the memory 902, the aggregate writer processing engine 120-$k$ responds to these instructions in the order in which the first chained-write packet 140$a$-$m$ and the second chained-write packet 140$a$-$n$ have been received. In the example illustrated in FIG. 8A, because the first chained-write packet 140$a$-$m$ was received at $t_k$ and the second chained-write packet 140$a$-$n$ was received later at $t_p > t_k$, data(A) will be written to region(j) of the memory 902 contiguously to previously written data(Z), then data(B) will be written to region(j) of the memory 902 contiguously to previously written data(A), in the following manner.

At 815 (corresponding to a time instance $t_q > t_k$), the aggregate writer processing engine 120-$k$ transmits a first write packet 140$b$-$m$ to instruct the memory controller 700 to write data(A) at address(i) of region(j) of the memory 902, where address(i) is adjacent to memory(i−1) to which data(Z) has previously been written. Note that while the first chained-write packet 140$a$-$m$ transmitted by the first originator processing engine 120-$m$ specifies the region(j) where data(A) is to be written but does not specify an actual address within the region(j) where data(A) is to be written, the first write packet 140$b$-$m$ transmitted by the aggregate writer processing engine 120-$k$ does specify the actual address(i) within the region(j) where data(A) is to be written. In this manner, the memory controller 700 writes data(A) to memory 902, in an aggregate manner, at address(i) of region(j), adjacent to data(Z) that has been previously written to address(i−1).

At 820 (corresponding to a time instance $t_r$, which is later than the time instance $t_q$ when the first write packet 140$b$-$m$ has been transmitted to the memory controller 700, $t_r > t_q$), the aggregate writer processing engine 120-$k$ transmits a second write packet 140$b$-$n$ to instruct the memory controller 700 to write data(B) at address(i+1) of region(j) of the memory 902, where address(i+1) is adjacent to memory(i) to which data(A) has previously been written. Note that while the second chained-write packet 140a-n transmitted by the second originator processing engine 120-n specifies the region(j) where data(B) is to be written but does not specify an actual address within the region(j) where data(B) is to be written, the second write packet 140b-m transmitted by the aggregate writer processing engine 120-k does specify the actual address(i+1) within the region(j) where data(B) is to be written. In this manner, the memory controller 700 writes data(B) to memory 902, in an aggregate manner, at address (i+1) of region(j), adjacent to data(A) that has been previously written to address(i).

Figure 8B:
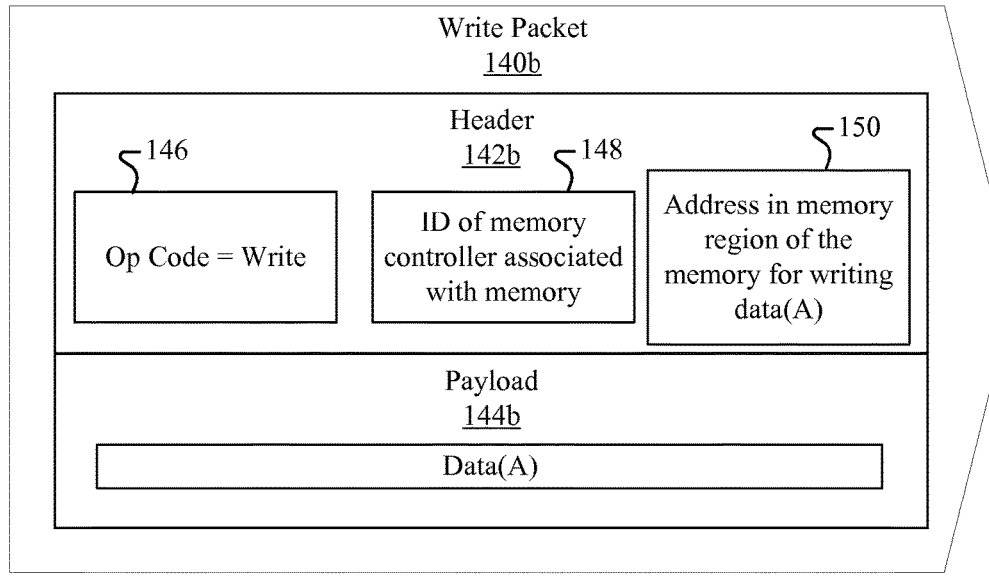

FIG. 8B shows an example of a write packet 140b that can be used in the conventional aggregate write process 800 to instruct a memory controller (e.g., the memory controller 700) associated with memory (e.g., the memory 902) to write data(A) (or data(B)) provided in the write packet to a memory address of the memory. The write packet 140b has a header 142b and a payload 144b. The payload 144b includes write data, e.g., data(A) or data(B). The header 142b includes at least an opcode 146, an ID 148 of the memory controller to which the write packet 140b is addressed and a memory address 150 (e.g., address(i)) at the memory with which the memory controller is associated. Here, the opcode 146 has a value corresponding to a "write" operation and specifies an instruction for the memory controller to write data(A) (or data(B)) at the memory address 150. The ID 148 and the memory address 150 can be provided in any of the forms described above in connection with FIG. 5.

Figure 8C:
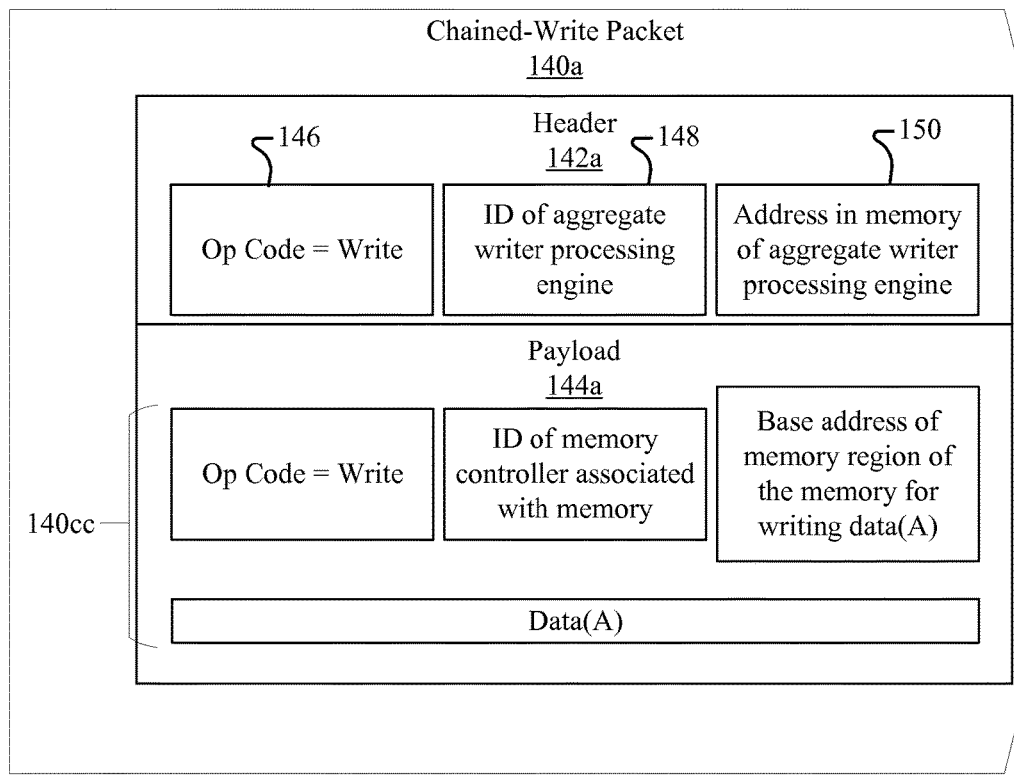

FIG. 8C shows an example of a chained-write packet 140a that can be used in the conventional aggregate write process 800 to instruct an aggregate writer processing engine (e.g., the processing engine 120-k) to write data(A) (or data(B)) provided in the packet to a memory region of memory (e.g., region(j) of the memory 902). The chained-write packet 140a has a header 142a and a payload 144a. The payload 144a includes data 140cc specifying a write opcode, an ID of a memory controller associated with the memory, and an ID of the memory region of the memory (e.g., a base address of the memory region), and data(A) (or data(B)) to be written in the memory region by the memory controller. The header includes at least an opcode 146, an ID 148 of the aggregate writer processing engine to which the chained-write packet 140a is addressed and an address 150 at memory (e.g., 124) associated with the aggregate writer processing engine. Here, the opcode 146 has a value corresponding to a "write" operation and specifies an instruction for the aggregate writer processing engine to temporarily write data 144 at the address 148. The IDs of the computing resources and the memory addresses specified in the chained-write packet 140a can be provided in any of the forms described above in connection with FIG. 5.

Note that in response to receiving the chained-write packet 140a, the aggregate writer processing engine determines an available contiguous memory address within the memory region specified in the data 140cc, such that the determined memory address is contiguous to another memory address within the specified region where other data has previously been written. Then, the aggregate writer processing engine generates the write packet 140b shown in FIG. 8B in the following manner: data(A) from data 140cc is placed in the payload 144b; the write opcode from data 140cc is placed in the opcode field 146 of the header 142b; the memory controller ID from data 140cc is placed in the ID field 148 of the header 142b; and the next available contiguous memory address from the region of memory determined based on the ID of the memory region from data 140cc is placed in the memory address field 150 of the header 142b.

Referring again to FIG. 8A, although the process 800 can be effectively used for its own purpose, its efficiency is not optimized for the following reasons. For example, at least one of the processing engines of the plurality of processing engines of a computing device 102, e.g., the aggregate writer processing engine 120-k is being used, at least in part, to perform aggregate writing to the memory 902, instead of using all computational cycles of the aggregate writer processing engine for performing number crunching computational tasks (e.g., weather prediction, fluid dynamics, etc.) along with the remaining ones of the plurality of processing engines. As another example, while a processing engine includes hardware optimized for performing number crunching computational tasks (e.g., weather prediction, fluid dynamics, etc.), the hardware of the processing engine is not optimized for communicating with a large number of the plurality of processing engines of the computing device 102. In contrast to the hardware of a processing engine, hardware of a memory controller 700 is optimized for communicating with a large number (e.g., all) of the plurality of processing engines of the computing device 102.

As such, the memory controller 700 described above in this specification can be modified to perform a more efficient aggregate write process than the conventional aggregate write process 800 described above in connection with FIG. 8A. Such modifications to the memory controller and an aggregate write process implemented in conjunction with the modified memory controller are described next.

Figure 9:
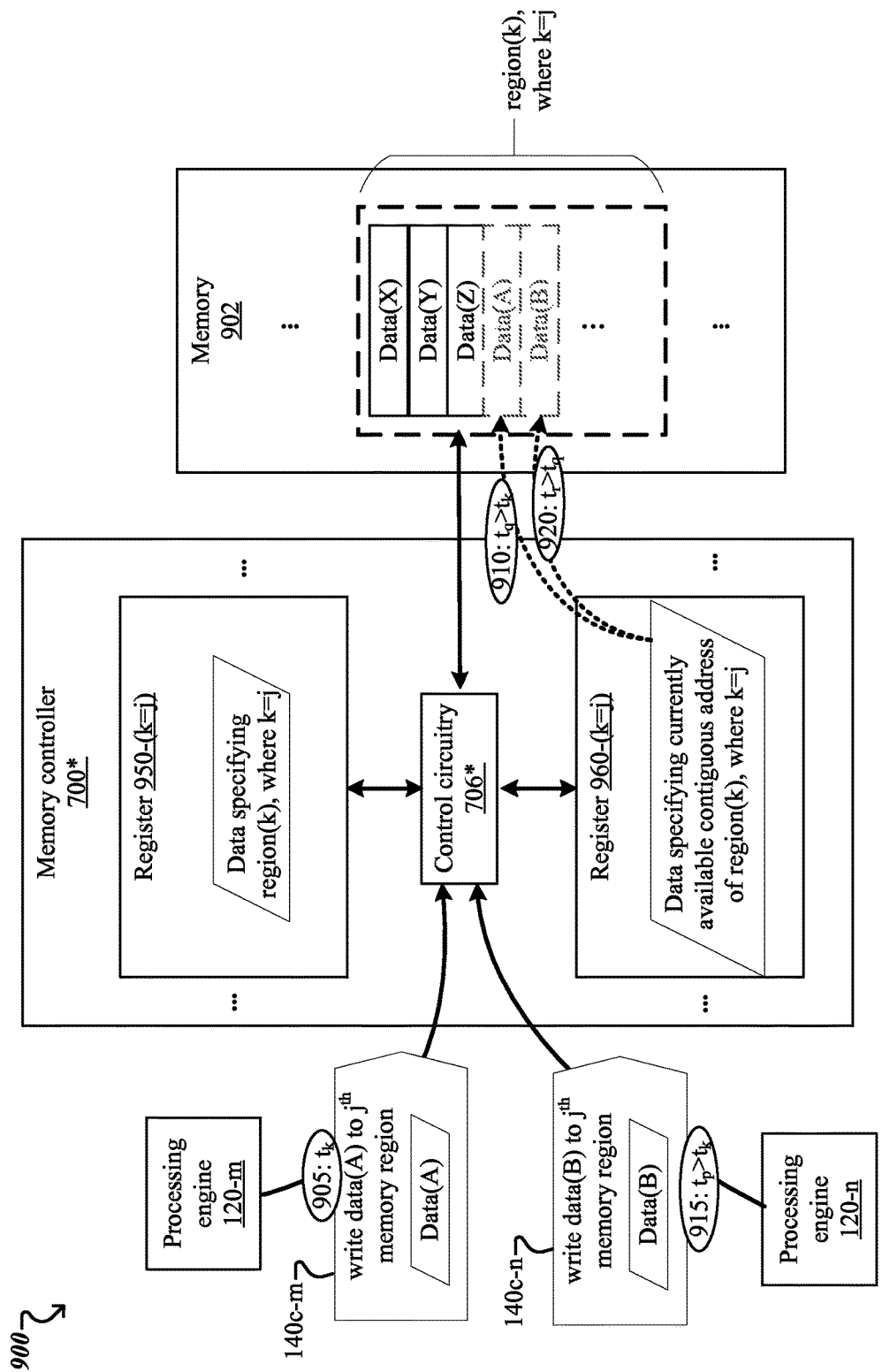
FIG. 9 shows aspects of an example of an AW process used by a memory controller associated with a memory to track availability of contiguous memory addresses of the memory and to write data received from a plurality of processing engines to the memory, in an aggregate manner.

FIG. 9 shows aspects of an example of an aggregate write process 900 used by a memory controller 700* associated with a memory 902 to track availability of contiguous memory addresses of the memory, and write data—received from a plurality of processing engines 120-m, 120-n, etc.— to the memory, in an aggregate manner. Note that the memory 902 supports random access and can be, e.g., random access memory (RAM), or solid state drive (SSD). Additionally, a memory address space of the memory 902 includes N memory regions, each memory region k, referred to simply as region(k), spanning contiguous memory addresses, where N≥2 and k=1 . . . N.

In some implementations, the plurality of processing engines 120-m, 120-n, and the memory controller 700* associated with the memory 902 are part of a computing system like the computing system 100 described above in connection with FIG. 1A, the computing system 100A described above in connection with FIG. 2A, or the computing system 100B described above in connection with FIG. 2B. For instance, an example of a processing engine 120 has been described above in connection with FIG. 3A and FIG. 4. In the example illustrated in FIG. 9, the processing engines 120-m and 120-n may be part of the same cluster (e.g., 110), or may be part of different clusters of the same processing device (e.g., 102) or of a different processing device. Moreover, the memory 902 with which the memory controller 700* is associated may be part of the same processing device or of a different processing device as the processing engines 120-m and 120-n.

Figure 12:
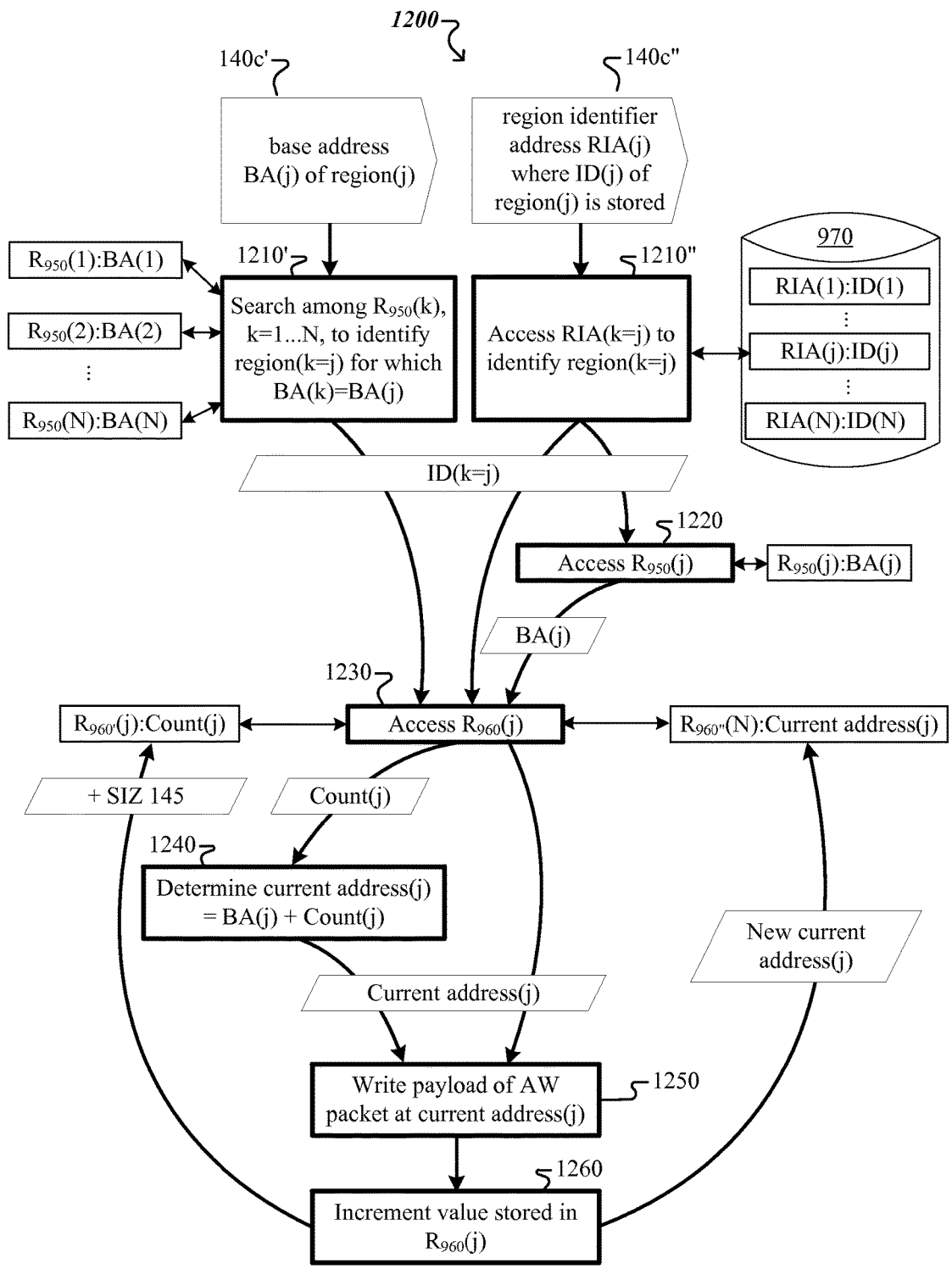
FIG. 12 shows examples of sub-processes of the AW process of FIG. 9.

In some implementations, the memory controller 700* shown in FIG. 9 is an improved embodiment of the memory controller 700 described above in connection with FIG. 7B. Similarly to the memory controller 700, the memory controller 700* includes control circuitry 706*. Here, some or all functionality of the control circuitry 706—described above in connection with FIG. 7B for the memory controller 700—is common to the functionality of control circuitry 706* illustrated in FIG. 9 for the memory controller 700*. Although not explicitly shown in FIG. 9, the memory controller 700* further includes some or all of remaining components of the memory controller 700, e.g., a packet interface 703, an engine interface 704 and a memory bus port 710. Structure and functionality of the latter memory controller components have been described above in connection with FIG. 7B. In addition, the memory controller 700* can include or can be communicatively coupled with read/write storage medium 970 that stores respective identifiers ID(1), . . . , ID(N) of region(1), . . . , region(N) of the memory 902. In some implementations, the read/write storage medium 970 can be a portion of the memory 902. Structural and functional aspects of the read/write storage medium 970 are described in detail below in connection with FIG. 12.

Referring again to FIG. 9, the memory controller 700* further includes a plurality of pairs of registers (950/960) in one-to-one correspondence with the N memory regions of the memory 902, where N≥2. Moreover, a $k^{th}$ pair of registers includes a first register 950-$k$ and a second register 960-$k$, where k=1 . . . N. As such, $1^{st}$ pair of registers (950-1/960-1) corresponds to region(1), $2^{nd}$ pair of registers (950-2/960-2) corresponds to region(2), . . . , $j^{th}$ pair of registers (950-$j$/960-$j$) corresponds to region(j), . . . , $N^{th}$ pair of registers (950-N/960-N) corresponds to region(N). The first register 950-$k$ is used by the control circuitry 706* to store first address data specifying the region(k) of the memory 902. The second register 960-$k$ is used by the control circuitry 706* to store second address data specifying a currently available memory address of region(k), the currently available memory address being contiguous with another memory address where data has been written as part of the previous write operation to the region(k). Here, the currently available memory address of region(k) is also referred to as the next write address of region(k) or, simply, the current memory address of region(k).

Figure 10A:
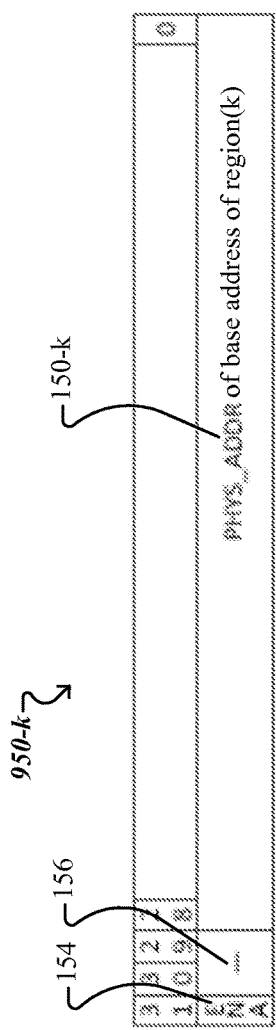
FIG. 10A shows aspects of a first register used in the AW process of FIG. 9.

The first address data—that specifies region(k) and is stored in the first register 950-$k$—includes a value 150-$k$ of a base memory address of region(k), as shown in FIG. 10A. The base memory address of region(k) is the first address of region(k) and can have a default value of zero. Remaining fields 154, 156 of this implementation of the first register 950-$k$ are listed below in Table 1.

TABLE 1

| Numerical reference | Field name | Field | Width | Description |
|---|---|---|---|---|
| 154 | ENA | 31 | 1 | Enable region(k). |
| 156 | rsvd | 30:29 | 2 | Writes have no effect. Reads return zeros. |
| 150-k | PHYS_ADDR | 28:0 | 29 | PD DDR3 physical starting address for all aggregate writes to region(k). |

Note that the first register 950-$k$ is a read/write register, and there are as many instances of the first register 950-$k$ as there are regions in the memory 902, where k=1 . . . N. Further note that the value 150-$k$ of the base memory address of region(k) recorded in the first register 950-$k$ can have a width of 27, 29 (shown in Table 1), 32, 34 bits or other widths.

Figure 10B:
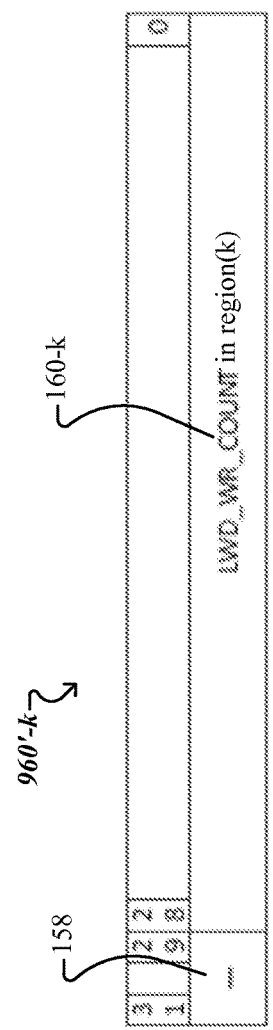
FIGS. 10B-10C show example implementations of a second register used in the AW process of FIG. 9.

In some implementations, the second address data—that specifies the currently available contiguous address in region (k) and is stored in the second register 960'-$k$—includes a total size 160-$k$ of write data contiguously written in region (k) starting at the base address 150-$k$, as shown in FIG. 10B. In this example, the total size of write data is expressed as a count of longwords that have been contiguously written to region(k), where one longword is a 32-bit value. Remaining field 158 of this implementation of the second register 960'-$k$ is listed below in Table 2.

TABLE 2

| Numerical reference | Field name | Field | Width | Description |
|---|---|---|---|---|
| 158 | rsvd | 30:29 | 2 | Writes have no effect. Reads return zeros. |
| 160-k | LWD_WR_COUNT | 28:0 | 29 | Increments for every longword written to region(k). |

Figure 10C:
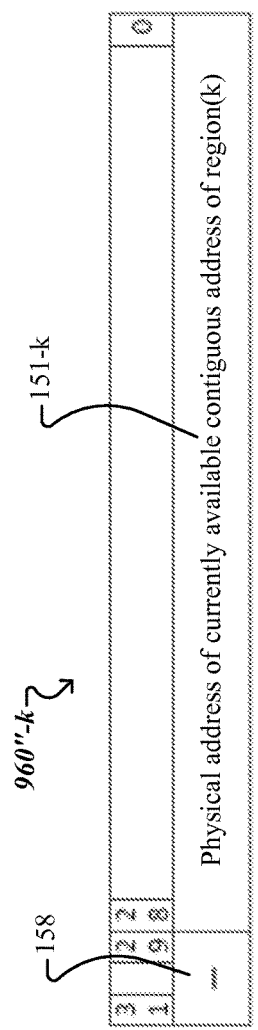

Note that the second register 960'-$k$ also is a read/write register. Further, the second register 960'-$k$ is automatically reset to zero when the corresponding first register 950-$k$ is written, or the second register 960'-$k$ can be directly written with a value which further aggregate writes would increment. Additionally, there are as many instances of the second register 960'-$k$ as there are regions in the memory 902, where k=1 . . . N. In other implementations, the second address data—that specifies the currently available contiguous address in region(k) and is stored in another embodiment 960"-$k$ of the second register—is an actual value 151-$k$ of a physical address corresponding to the currently available contiguous address in region(k), as shown in FIG. 10C. In this example, the actual value 151-$k$ of a physical address corresponding to the currently available contiguous address in region(k) is provided in any of the forms described above in connection with FIG. 5. Remaining field 158 of this implementation of the second register 960"-$k$ is listed below in Table 3.

TABLE 3

| Numerical reference | Field name | Field | Width | Description |
|---|---|---|---|---|
| 158 | rsvd | 30:29 | 2 | Writes have no effect. Reads return zeros. |
| 151-k | PHYS_ADDR | 28:0 | 29 | PD DDR3 physical address for currently available contiguous address in region(k). |

Note that the second register 960"-$k$ also is a read/write register. Further, the second register 960"-$k$ is automatically reset to a first address of region(k) when the corresponding first register 950'-$k$ is written. Additionally, there are as many instances of the second register 960"-$k$ as there are regions in the memory 902, where k=1 . . . N. Furthermore, the actual value 151-$k$ of a physical address recorded in the second register 960"-$k$ can have a width of 29 bits or other width values.

Referring again to FIG. 9, at 905 (corresponding to a time instance $t_k$), the control circuitry 706* of the memory controller 700* receives a first aggregate write (AW) packet 140$c$-$m$ from a first processing engine 120-$m$. The first processing engine 120-$m$ uses the first AW packet 140$c$-$m$ to instruct the memory controller 700* to write data A (denoted data(A)) to region(j) of the memory 902, in an aggregate manner. As noted above, writing data(A) to region(j) in an aggregate manner means writing data(A) to a currently available memory address that is contiguous with another memory address to which data has been written as part of the previous write operation to the region(j). Note that while the first AW packet 140c-m includes data specifying region(j) of the memory 902, it does not include data specifying an actual memory address of region(j) where data(A) is to be written, because the first processing engine 120-m neither knows nor needs not know the actual memory address where data(A) will be, or has been, written within region(j).

Figure 11A:
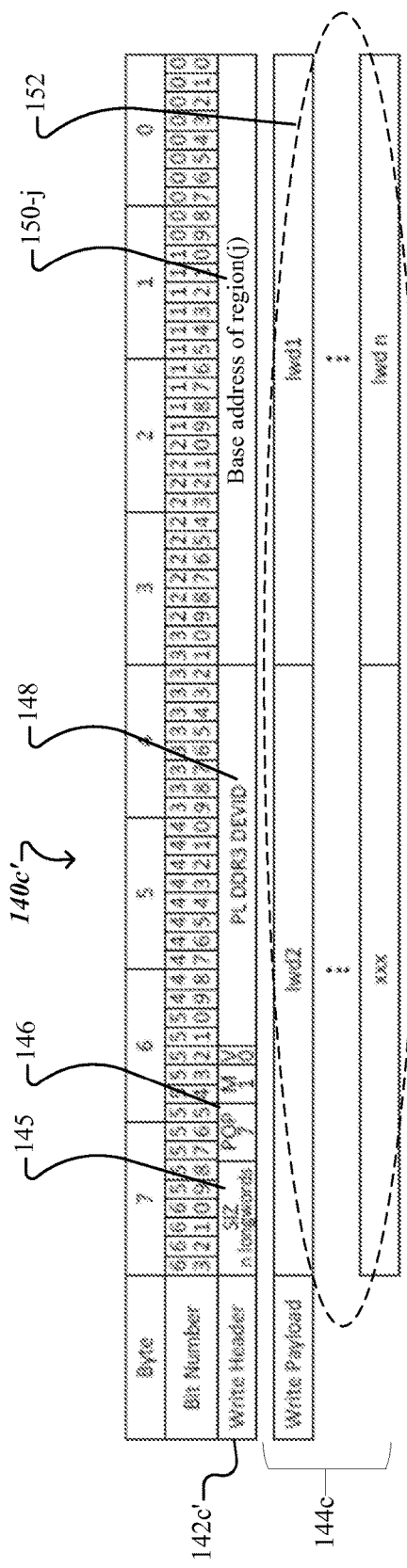
FIGS. 11A-11B show example implementations of an AW packet used in the AW process of FIG. 9.
Figure 11B:
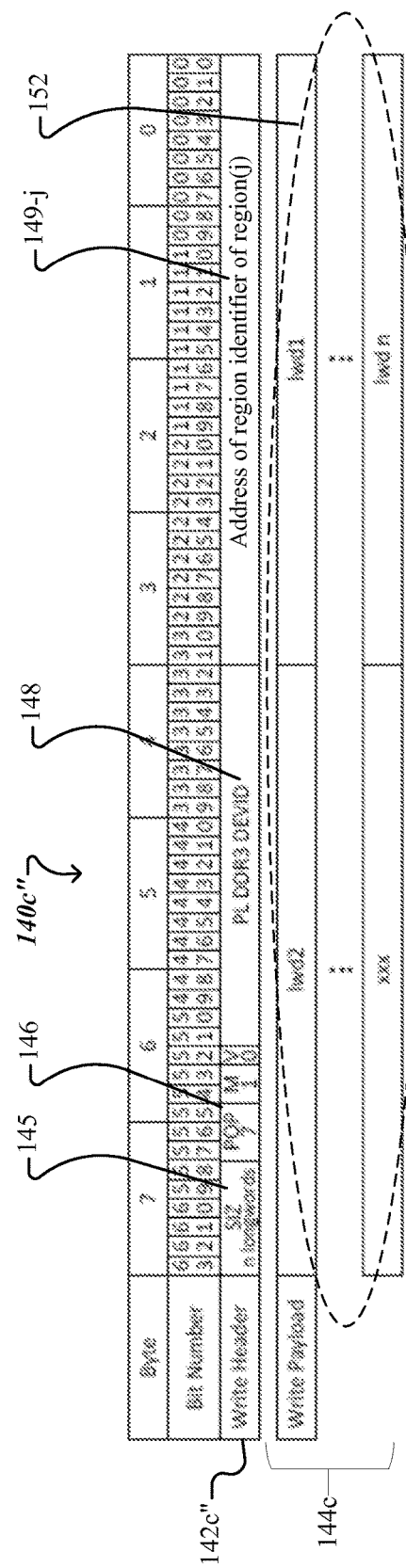

The first AW packet 140c-m received by the memory controller 700* is implemented in some cases like the example of AW packet 140c' shown in FIG. 11A and in other cases like the example of AW packet 140c" shown in FIG. 11B. The AW packet 140c'/140c" has a header 142c'/142" and a payload 144c. The payload 144c includes write data 152 (corresponding to data(A) of the first AW packet 140c-m, for instance). The header 142c'/142c" includes at least payload size information 145, an opcode 146 and an ID 148 of the memory 902. Further, the header 142c' includes a base memory address 150-j of region(j) of the memory 902 to which the write data 152 is to be written in an aggregate manner, while the header 142c" includes a region identifier address 149-j where a region identifier ID(j) is stored, the region identifier ID(j) corresponding to region(j) of the memory 902 to which the write data 152 is to be written in an aggregate manner. Here, a value of the payload size 145 can be a number of longwords corresponding to the write data 152 in the payload 144c (e.g., the size of data(A) of the first AW packet 140c-m). In some implementations, the opcode 146 can have a value corresponding to an "aggregate write" operation and specifies an instruction for the memory controller 700* to write the write data 152 to region(j) that has as its (i) first memory address the base memory address 150-j specified in the AW packet 140c' or (ii) region identifier the region identifier ID(j) stored at the region identifier address 149-j specified by the AW packet 140c". The ID 148, the base memory address 150-j and the region identifier address 149-j can be provided in any of the forms described above in connection with FIG. 5. Moreover, the base memory address 150-j specified in the AW packet 140c' matches a base memory addresses 150-k stored in a first register 950-k of a pair of registers (950-k/960-k) corresponding to one region(k=j) of the N memory regions of the memory 902, while the region identifier ID(j) stored at the region identifier address 149-j specified in the AW packet 140c" corresponds to region identifier ID(k=j) of one region (k=j) of the N memory regions of the memory.

Referring again to FIG. 9, at 910 (corresponding to a time instance $t_q > t_k$), the control circuitry 706* writes data(A) to a currently available contiguous address of region(j). Operations performed at 910 depend on the nature of the second address data—specifying the currently available contiguous address in region(k)—that is stored in either field 160-k of the second register 960'-k or field 151-k of the second register 960"-k, for k=1 . . . N. Additionally, the operations performed at 910 further depend on whether the memory address—specifying region(j) of the memory 902—is received by the memory controller 700* in field 150-j of an AW packet 140c' or in field 149-j of an AW packet 140c". Various combinations of operations performed at 910 are described below in connection with FIG. 12.

In some implementations, the second register 960'-k stores a count(k) 160-k of longwords write data that have been contiguously written in region(k) starting at its base address BA(k) 150-k, where k=1 . . . N; and an AW packet of type 140c' received at 905 specifies a base address BA(j) 150-j of region(j). Here, the control circuitry 706* performs a first combination of operations of aggregate write (AW) process 1200: 1210'→1230→1240→1250→1260.

At 1210', the control circuitry 706* searches among the N first registers 950-k to match the base address BA(j) specified in the received AW packet 140c' with one of the base addresses BA(k) stored in the respective first registers 950-k, where k=1 . . . N. Region(k=j) for which the specified base address BA(j) matches the stored base address BA(k), i.e., BA(j)=BA(k), is identified as the region to which the write data (e.g., data(A)) included in the payload of the received AW packet 140c' is to be contiguously written. At 1230, the control circuitry 706* accesses the second register 960'-j of the identified region(j) to retrieve a value 160-j stored therein that represents the count(j) of longwords that have been contiguously written to the identified region(j). At 1240, the control circuitry 706* determines a currently available contiguous address of region(j), here referred to as current address(j), as a sum of (i) the base address BA(j) specified in the received AW packet 140c' and (ii) the count(j) retrieved from the second register 960'-j. At 1250, the control circuitry 706* writes the write data (e.g., data (A)) included in the payload of the received AW packet 140c' to the determined current address(j). In the example illustrated in FIG. 9, the control circuitry 706* writes data(A) contiguously to previously written data(Z). Once the write data (e.g., data(A)) has been dispatched for writing at the current address(j), at 1260, the control circuitry 706* increments the value of the count(j) stored in the second register 960'-j of region(j) by the size of the write data. As such, an incremented value stored in the second register 960'-j of region(j) is count(j)=count(j)+SIZ, where SIZ is a value of the size 145 of the payload of the received AW packet 140c' (which, in the example illustrated in FIG. 9, represents the size of data(A)).

At least some of the first combination of operations of the AW process 1200 described above can be summarized using the following pseudo-code:

```
if (AW_packet is Write) {
    region = AW_packet address field
    for (longwords in AW_packet SIZ field) {
        write longword to address in (Base Address Reg + Write Count Reg)
        increment Write Count Reg
    }
}
```

Here, the first register 950-k is labeled "Base Address Reg", and the second register 960-k is labeled "Write Count Reg".

In other implementations, the second register 960'-k stores a count(k) 160-k of longwords write data that have been contiguously written in region(k) starting at its base address BA(k) 150-k, where k=1 . . . N; and an AW packet of type 140c" received at 905 specifies a region identifier address RIA(j) 149-j where a region identifier ID(j) corresponding to region(j) is stored. Here, the control circuitry 706* performs a second combination of operations of the AW process 1200: 1210"→1220→1230→1240→1250→1260.

At 1210", the control circuitry 706* accesses the region identifier address RIA(j) specified in the received AW packet 140c" to retrieve region identifier ID(j) stored at the specified region identifier address RIA(j). The retrieved region identifier ID(j) identifies region(k=j) from among the N regions(k) of memory 902, where k=1 . . . N.

Note that the specified region identifier address RIA(j) is one of region identifier addresses RIA(1), . . . , RIA(N) which store respective region identifiers ID(1), . . . , ID(N)

corresponding to region(1), ..., region(N) of memory 902. The N region identifier addresses RIA(k), where k=1 ... N, are part of memory address space of read/write storage medium 970 associated with the memory controller 700*. In some cases, the read/write storage medium 970 is implemented as part of cluster memory 118 described above in connection with FIGS. 3A and 7A. In some other cases, the read/write storage medium 970 is implemented as N region identifier registers at the respective N region identifier addresses RIA(k), each of the region identifier registers storing a respective region identifier ID(k) for region(k) of the N memory regions of the memory 902. For example, the region identifier ID(k) for region(k) can be an integer 1, 2, ..., N corresponding to region(1), region(2), ..., region(N) of the memory 902. The default value of the region identifier ID(k) can be 1, for instance. As another example, the region identifier ID(k) for region(k) can be an ASCII character a, b, ..., z (for a total of N ASCII characters) corresponding to region(1), region(2), ..., region(N) of the memory 902. As yet another example, the region identifier ID(k) for region(k) can be a string reg_1, reg_2, ..., reg_N corresponding to region(1), region(2), ..., region(N) of the memory 902.

Continuing on with the description of the second combination of operations of the AW process 1200, at 1220, the control circuitry 706* accesses the first register 950-*j* of the identified region(j) to retrieve a value 150-*j* stored therein that represents the base addresses BA(j) of region(j). At 1230, the control circuitry 706* accesses the second register 960'-*j* of the identified region(j) to retrieve a value 160-*j* stored therein that represents the count(j) of longwords that have been contiguously written to identified region(j). At 1240, the control circuitry 706* determines a currently available contiguous address of region(j), here referred to as current address(j), as a sum of (i) the base address BA(j) retrieved from the first register 950-*j* and (ii) the count(j) retrieved from the second register 960'-*j*. At 1250, the control circuitry 706* writes the write data (e.g., data(A)) included in the payload of the received AW packet 140*c''* to the determined current address(j). Once the write data (e.g., data(A)) has been dispatched for writing at the current address(j), at 1260, the control circuitry 706* increments the value of the count(j) stored in the second register 960'-*j* of region(j) by the size of the write data. As such, an incremented value stored in the second register 960'-*j* of region(j) is count(j)=count(j)+SIZ, where SIZ is a value of the size 145 of the payload of the received AW packet 140*c''* (which, in the example illustrated in FIG. 9, represents the size of data(A)).

In some other implementations, the second register 960''-*k* stores an actual value 151-*k* of a physical address corresponding to the currently available contiguous address in region(k), where k=1 ... N, and an AW packet of type 140*c'* received at 905 specifies a base address BA(j) 150-*j* of region(j). Here, the control circuitry 706* performs a third combination of operations of the AW process 1200: 1210'→1230→1250→1260.

At 1210', the control circuitry 706* searches among the N first registers 950-*k* to match the base address BA(j) specified in the received AW packet 140*c'* with one of the base addresses BA(k) stored in the respective first registers 950-*k*, where k=1 ... N. Region(k=j) for which the specified base address BA(j) matches the stored base address BA(k), i.e., BA(j)=BA(k), is identified as the region to which the write data (e.g., data(A)) included in the payload of the received AW packet 140*c'* is to be contiguously written. At 1230, the control circuitry 706* accesses the second register 960''-*j* of the identified region(j) to retrieve a value 151-*j* stored therein that represents the currently available contiguous address in region(j), here referred to as current address(j). At 1250, the control circuitry 706* writes the write data (e.g., data(A)) included in the payload of the received AW packet 140*c'* to the retrieved current address(j). Once the write data (e.g., data(A)) has been dispatched for writing at the current address(j), at 1260, the control circuitry 706* increments the value of the count(j) stored in the second register 960''-*j* of region(j) by the size of the write data. As such, an incremented value stored in the second register 960''-*j* of region(j) is current address(j)=current address(j)+SIZ, where SIZ is a value of the size 145 of the payload of the received AW packet 140*c'* (which, in the example illustrated in FIG. 9, represents the size of data(A)).

In yet some other implementations, the second register 960''-*k* stores an actual value 151-*k* of a physical address corresponding to the currently available contiguous address in region(k), where k=1 ... N, and an AW packet of type 140*c''* received at 905 specifies a region identifier address RIA(j) 149-*j* where a region identifier ID(j) corresponding to region(j) is stored. Here, the control circuitry 706* performs a fourth combination of operations of the AW process 1200: 1210''→1230→1250→1260.

At 1210'', the control circuitry 706* accesses the region identifier address RIA(j) specified in the received AW packet 140*c''* to retrieve region identifier ID(j) stored at the specified region identifier address RIA(j). As described above, the specified region identifier address RIA(j) is one of region identifier addresses RIA(1), ..., RIA(N) which store respective region identifiers ID(1), ..., ID(N) corresponding to region(1), ..., region(N) of memory 902, where the N region identifier addresses RIA(k), where k=1 ... N, are part of memory address space of the read/write storage medium 970 associated with the memory controller 700*. The retrieved region identifier ID(k=j) identifies region(k=j) from among the N regions(k) of memory 902. At 1230, the control circuitry 706* accesses the second register 960''-*j* of the identified region(j) to retrieve a value 151-*j* stored therein that represents the currently available contiguous address in region(j), here referred to as current address(j). At 1250, the control circuitry 706* writes the write data (e.g., data(A)) included in the payload of the received AW packet 140*c''* to the retrieved current address(j). Once the write data (e.g., data(A)) has been dispatched for writing at the current address(j), at 1260, the control circuitry 706* increments the value of the count(j) stored in the second register 960''-*j* of region(j) by the size of the write data. As such, an incremented value stored of the in the second register 960''-*j* of region(j) is current address(j)=current address(j)+SIZ, where SIZ is a value of the size 145 of the payload of the received AW packet 140*c''* (which, in the example illustrated in FIG. 9, represents the size of data(A)).

Note that, regardless of which of the combinations of operations of the AW process 1200 described above are used to perform aggregate writes, if after a number of aggregate writes a size 145 of write data 152 being written to a currently available contiguous address of region(k) is greater than a difference between a value of the last address of region(k) and a value of the currently available contiguous address, then the value of the last address wraps inside region(k) and becomes a value of the first address of region(k). In this manner, a remaining portion of the write data 152—that would have been written to contiguous addresses beyond the last address of region(k), i.e., outside of region(k)—is written instead to the first address of region(k).

Referring again to FIG. 9, at 915 (corresponding to a later time instance $t_p > t_k$), the control circuitry 706* of the memory controller 700* can receive a second AW packet 140c-n from a second processing engine 120-n. The second processing engine 120-n uses the second AW packet 140c-n to instruct the memory controller 700* to write data B (denoted data(B)) also to region(j) of the memory 902 and also in aggregate manner. Note that while the second AW packet 140c-n includes data specifying region(j) of the memory 902, it does not include data specifying an actual memory address of region(j) where data(B) is to be written, because the second processing engine 120-n neither knows nor needs not know the actual memory address where data(B) will be, or has been, written within region(j).

Here, because both the first AW packet 140c-m and the second AW packet 140c-n include data specifying instructions for the memory controller 700* to write respective data(A) and data(B) to the same region(j) of the memory 902, the control circuitry 706* responds to these instructions in the order in which the first AW packet 140c-m and the second AW packet 140c-n have been received. In the example illustrated in FIG. 9, because the first AW packet 140c-m was received at $t_k$ and the second AW packet 140c-n was received later at $t_p > t_k$, data(A) will be dispatched for aggregate writing to region(j) of the memory 902 before data(B) will be dispatched for aggregate writing to the same region(j). In some implementations, delaying the dispatching for aggregate writing of data(B)—until after the dispatching for aggregate writing of data(A)—is performed by the control circuitry 706*. In other implementations, the packet interface 703 of the memory controller 700* delays delivery of the second AW packet 140c-n to the control circuitry 706* until after data(A) has been dispatched for aggregate writing.

At 920, (corresponding to a time instance $t_r$, which is later than the time instance $t_q$ when data(A)—received with the first AW write packet 140c-m—has been dispatched by the memory controller 700* for writing to region(k=j), $t_r > t_q$), the control circuitry 706* writes data(B) to a currently available contiguous address of region(k=j) in accordance with the process 1200, e.g., using one of the first, second, third or fourth combinations of operations of the AW process 1200 described above for 910. Upon completion of 920, data(B) will have been written to the currently available contiguous address of region(k=j) determined, at 920, in accordance with the process 1200.

In the example illustrated in FIG. 9, in some cases, data(A) has already been contiguously written to region(k=j) adjacent to data(Z)—as part of the previous aggregate write to region(k=j) performed at 910—before data(B) is being written, at 920, adjacent to data(A). However, in other cases, although data(B) had been dispatched, at 915, for aggregate writing to region(j) of the memory 902 after data(A), data(B) has already been written, at 920, to region(j) before data(A) is being written, at 910, between, and adjacent to both, data(Z) and data(B).

As described above, the combinations of operations of the AW process 1200 performed at 910 or 920 can be implemented in the control circuitry 706* of the memory controller 700*. In other implementations, some operations of the AW process 1200 can be implemented, at 910 or 920, in part, in the packet interface 703 (e.g., one or more of operations 1210'/1210", 1220, 1230 or 1260) and, in part, in the control circuitry 706* (e.g., operations 1240 and 1250 and remaining ones of operations 1210'/1210", 1220, 1230 or 1260 that are not performed by the packet interface 703.)

Note that any one of the processing engines 120 of the computing device(s) 102 can read the data written in an aggregate manner to any of the N regions of the memory 902, e.g., to region(j), and, then, sort the retrieved data, for instance.

In some implementations, a memory controller may be configured as specified in the following clauses.

1. A memory controller comprising:
   (a) a first register;
   (b) a second register; and
   (c) control circuitry configured to
   (i) store, in the first register, first address data specifying a memory region from among a plurality of memory regions in a memory associated with the memory controller, wherein the memory has an associated memory space and supports random access to addresses of the memory space, wherein each of the memory regions spans a plurality of addresses of the memory space, and wherein the first address data comprises a value of base memory address of the specified memory region;
   (ii) store, in the second register, second address data corresponding to a current memory address of the specified memory region, the current memory address being contiguous with a previously written memory address of the specified memory region;
   (iii) receive, from a first computing resource, first write data to be written in the specified memory region;
   (iv) write the first write data at the current memory address based on the value of the base memory address of the specified memory region and the second address data corresponding to the current memory address; and
   (v) increment the second address data in the second register to update the current memory address based on a size of the first write data written at the current memory address.

2. The memory controller of clause 1, wherein
   the second address data corresponding to the current memory address comprises a total size of write data contiguously written in the specified memory region starting at the base address;
   the first write data is packaged in a payload of a packet transmitted by the first computing resource, a header of the packet comprising a first memory address; and
   the control circuitry is further configured to
      determine that the first address matches the base memory address stored in the first register, and
      upon this determination, calculate the current memory address as a sum of (a) the value of base memory address of the specified memory region and (b) the total size of write data contiguously written in the specified memory region.

3. The memory controller of clause 1, wherein
   the second address data corresponding to the current memory address specifies a value of the current memory address of the specified memory region;
   the first write data is packaged in a payload of a packet transmitted by the computing resource, a header of the packet comprising a first memory address; and
   the control circuitry is further configured to
      determine that the first address matches the base memory address stored in the first register, and
      upon this determination, retrieve the value of the current memory address from the second register.

4. The memory controller of clause 1, wherein
the second address data corresponding to the current memory address comprises a total size of write data contiguously written in the specified memory region starting at the base address;
an identifier of the specified memory region is stored at a corresponding region identifier address of the memory space;
the first write data is packaged in a payload of a packet transmitted by the computing resource, a header of the packet comprising the region identifier address; and
the control circuitry is further configured to
retrieve from the region identifier address the identifier of the specified region, and
upon this retrieval, calculate the current memory address as a sum of (a) the value of base memory address of the specified memory region and (b) the total size of write data contiguously written in the specified memory region.

5. The memory controller of clause 1, wherein the control circuitry is further configured to
(vi) delay writing second write data, received from a second computing resource after the first write data had been received from the first computing resource, until the second address data has been incremented after the first write data had been dispatched for writing at the current memory address.

6. The memory controller of clause 1, wherein the computing resource, the memory controller and the memory are included in a computing system.

7. The memory controller of clause 1, wherein the memory comprises random access memory (RAM).

In some implementations, a method may be specified as in the following clauses.

8. A method performed by a memory controller, the method comprising:
storing, in a first register associated with the memory controller, first address data specifying a memory region from among a plurality of memory regions in a memory associated with the memory controller, wherein the memory has an associated memory space and supports random access to addresses of the memory space, wherein each of the memory regions spans a plurality of addresses of the memory space, and wherein the first address data comprises a value of base memory address of the specified memory region;
storing, in a second register associated with the memory controller, second address data corresponding to a current memory address of the specified memory region, the current memory address being contiguous with a previously written memory address of the specified memory region;
receiving, from a first computing resource, first write data to be written by the memory controller in the specified memory region;
writing the first write data at the current memory address based on the value of the base memory address of the specified memory region and the second address data corresponding to the current memory address; and
incrementing the second address data in the second register to update the current memory address based on a size of the first write data written at the current memory address.

9. The method of clause 8, wherein
the second address data corresponding to the current memory address comprises a total size of write data contiguously written in the specified memory region starting at the base address;
the first write data is packaged in a payload of a packet transmitted by the first computing resource, a header of the packet comprising a first memory address; and
the method further comprises
determining that the first address matches the base memory address stored in the first register, and upon that,
calculating the current memory address as a sum of (a) the value of base memory address of the specified memory region and (b) the total size of write data contiguously written in the specified memory region.

10. The method of clause 8, wherein
the second address data corresponding to the current memory address specifies a value of the current memory address of the specified memory region;
the first write data is packaged in a payload of a packet transmitted by the computing resource, a header of the packet comprising a first memory address; and
the method further comprises
determining that the first address matches the base memory address stored in the first register, and upon that,
retrieving the value of the current memory address from the second register.

11. The method of clause 8, wherein
the second address data corresponding to the current memory address comprises a total size of write data contiguously written in the specified memory region starting at the base address;
an identifier of the specified memory region is stored at a corresponding region identifier address of the memory space;
the first write data is packaged in a payload of a packet transmitted by the computing resource, a header of the packet comprising the region identifier address; and
the method further comprises
retrieving from the region identifier address the identifier of the specified region, and upon that,
calculate the current memory address as a sum of (a) the value of base memory address of the specified memory region and (b) the total size of write data contiguously written in the specified memory region.

12. The method of clause 8, further comprising:
delaying of writing second write data, received from a second computing resource after the first write data had been received from the first computing resource, until the second address data has been incremented after the first write data had been dispatched for writing at the current memory address.

13. The method of clause 8, wherein the computing resource, the memory controller and the memory are included in a computing system.

14. The method of clause 8, wherein the memory comprises random access memory (RAM).

In some implementations, a computing system may be configured as specified in the following clauses.

15. A computing system comprising:
a plurality of processing engines;
a memory controller; and
memory associated with the memory controller, the memory having an associated memory space and supporting random access to addresses of the memory space, the memory including a plurality of memory regions, each of the memory regions spanning a plurality of addresses of the memory space, wherein the memory controller comprises
(a) a first register;
(b) a second register; and
(c) control circuitry configured to
  (i) store, in the first register, first address data specifying a memory region from among the plurality of memory regions, the first address data comprising a value of base memory address of the specified memory region;
  (ii) store, in the second register, second address data corresponding to a current memory address of the specified memory region, the current memory address being contiguous with a previously written memory address of the specified memory region;
  (iii) receive, from a first processing engine from among the plurality of processing engines, first write data to be written in the specified memory region;
  (iv) write the first write data at the current memory address based on the value of the base memory address of the specified memory region and the second address data specifying the current memory address; and
  (v) increment the second address data in the second register to update the current memory address based on a size of the first write data written at the current memory address.

16. The computing system of clause 15, wherein
the second address data corresponding to the current memory address comprises a total size of write data contiguously written in the specified memory region starting at the base address;
the first write data is packaged in a payload of a packet transmitted by the first processing engine, a header of the packet comprises a first memory address; and
the control circuitry is further configured to
determine that the first address matches the base memory address stored in the first register, and
upon this determination, calculate the current memory address as a sum of (a) the value of base memory address of the specified memory region and (b) the total size of write data contiguously written in the specified memory region.

17. The computing system of clause 15, wherein
the second address data corresponding to the current memory address specifies a value of the current memory address of the specified memory region;
the first write data is packaged in a payload of a packet transmitted by the computing resource, a header of the packet comprising a first memory address; and
the control circuitry is further configured to
determine that the first address matches the base memory address stored in the first register, and
upon this determination, retrieve the value of the current memory address from the second register.

18. The computing system of clause 15, wherein
the second address data corresponding to the current memory address comprises a total size of write data contiguously written in the specified memory region starting at the base address;
an identifier of the specified memory region is stored at a corresponding region identifier address of the memory space;
the first write data is packaged in a payload of a packet transmitted by the computing resource, a header of the packet comprising the region identifier address; and
the control circuitry is further configured to
retrieve from the region identifier address the identifier of the specified region, and
upon this retrieval, calculate the current memory address as a sum of (a) the value of base memory address of the specified memory region and (b) the total size of write data contiguously written in the specified memory region.

19. The computing system of clause 15, wherein the control circuitry is further configured to
(vi) delay writing second write data, received from a second processing engine from among the plurality of processing engines after the first write data had been received from the first processing engine, until the second address data has been incremented after the first write data had been dispatched for writing at the current memory address.

20. The computing system of clause 15, wherein at least a portion thereof that includes the memory controller and at least some of the plurality of processing engines is implemented as a system on a chip (SoC).

21. The computing system of clause 15, wherein the memory comprises random access memory (RAM).

22. The computing system of clause 15, wherein the memory comprises a solid state drive (SSD).

23. The computing system of clause 15, wherein at least one processing engine of the plurality of processing engines is implemented as a microprocessor, a microcontroller, a field programmable gate array (FPGA) or an application specific integrated circuit (ASIC).

In some implementations, another memory controller may be configured as specified in the following clauses.

24. A memory controller comprising:
(a) a register; and
(b) control circuitry configured to
  (i) store, in the register, a current memory address of one of a plurality of memory regions in a memory associated with the memory controller, wherein the memory has an associated memory space and supports random access to addresses of the memory space, wherein each of the memory regions spans a plurality of addresses of the memory space, wherein the current memory address is contiguous with a previously written memory address of the one of the plurality of memory regions, and wherein an identifier of the one of the plurality of memory regions is stored at a corresponding region identifier address of the memory space;
  (ii) receive, from a first computing resource, first write data to be written in a memory region identified by the identifier stored at the region identifier address that corresponds to the one of the plurality of memory regions;
  (iii) determine that the identified memory region is the one of the plurality of memory regions and retrieve the current memory address of the one of the plurality of memory regions from the register;
  (iv) write the first write data at the current memory address; and
  (v) update the current memory address stored in the register based on a size of the first write data written at the current memory address.

25. The memory controller of clause 24, wherein the control circuitry is further configured to
(vi) delay writing second write data, received from a second computing resource after the first write data had been received from the first computing resource, until the second address data has been incremented after the first write data had been dispatched for writing at the current memory address.

26. The memory controller of clause 24, wherein the computing resource, the memory controller and the memory are included in a computing system.

27. The memory controller of clause 24, wherein the memory comprises random access memory (RAM).

In some implementations, another method may be specified as in the following clauses.

28. A method performed by a memory controller, the method comprising:
storing, in a register associated with the memory controller, a current memory address of one of a plurality of memory regions in a memory associated with the memory controller, wherein the memory has an associated memory space and supports random access to addresses of the memory space, wherein each of the memory regions spans a plurality of addresses of the memory space, wherein the current memory address is contiguous with a previously written memory address of the one of the plurality of memory regions, and wherein an identifier of the one of the plurality of memory regions is stored at a corresponding region identifier address of the memory space;
receiving, from a first computing resource, first write data to be written in a memory region identified by the identifier stored at the region identifier address that corresponds to the one of the plurality of memory regions;
determine that the identified memory region is the one of the plurality of memory regions and retrieve the current memory address of the one of the plurality of memory regions from the register;
writing the first write data at the current memory address; and
updating the current memory address stored in the register based on a size of the first write data written at the current memory address.

29. The method of clause 28, further comprising:
delaying of writing second write data, received from a second computing resource after the first write data had been received from the first computing resource, until the second address data has been incremented after the first write data had been dispatched for writing at the current memory address.

30. The memory controller of clause 28, wherein the computing resource, the memory controller and the memory are included in a computing system.

31. The memory controller of clause 28, wherein the memory comprises random access memory (RAM).

In some implementations, another computing system may be configured as specified in the following clauses.

32. A computing system comprising:
a plurality of processing engines;
a memory controller; and
memory associated with the memory controller, the memory having an associated memory space and supporting random access to addresses of the memory space, the memory including a plurality of memory regions, each of the memory regions spanning a plurality of addresses of the memory space,
wherein the memory controller comprises
(a) a register; and
(b) control circuitry configured to
(i) store, in the register, a current memory address of one of the plurality of memory regions, the current memory address being contiguous with a previously written memory address of the one of the plurality of memory regions, and an identifier of the one of the plurality of memory regions being stored at a corresponding region identifier address of the memory space;
(ii) receive, from a first processing engine from among the plurality of processing engines, first write data to be written in a memory region identified by the identifier stored at the region identifier address that corresponds to the one of the plurality of memory regions;
(iii) determine that the identified memory region is the one of the plurality of memory regions and retrieve the current memory address of the one of the plurality of memory regions from the register;
(iv) write the first write data at the current memory address; and
(v) update the current memory address stored in the register based on a size of the first write data written at the current memory address.

33. The computing system of clause 32, wherein the control circuitry is further configured to
(vi) delay writing second write data, received from a second processing engine from among the plurality of processing engines after the first write data had been received from the first computing resource, until the second address data has been incremented after the first write data had been dispatched for writing at the current memory address.

34. The computing system of clause 32, wherein at least a portion thereof that includes the memory controller and at least some of the plurality of processing engines is implemented as a system on a chip (SoC).

35. The computing system of clause 32, wherein the memory comprises random access memory (RAM).

36. The computing system of clause 32, wherein the memory comprises a solid state drive (SSD).

37. The computing system of clause 32, wherein at least one processing engine of the plurality of processing engines is implemented as a microprocessor, a microcontroller, a field programmable gate array (FPGA) or an application specific integrated circuit (ASIC).

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of control circuitry, e.g., state machines, microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A memory controller coupled with a memory, the memory comprising a first memory region and a second memory region, the memory being associated with a memory space and supporting random access to addresses of the memory space, and wherein the first memory region spans a first plurality of addresses of the memory space and the second memory region spans a second plurality of addresses of the memory space, the memory controller comprising:
   (I) a first pair of registers corresponding to the first memory region, wherein
      (a) a first register of the first pair stores a base memory address of the first memory region, and
      (b) a second register of the first pair stores address data corresponding to a current memory address of the first memory region, the current memory address of the first memory region being contiguous with a previously written memory address of the first memory region;
   (II) a second pair of registers corresponding to the second memory region, wherein
      (a) a first register of the second pair stores a base memory address of the second memory region, and
      (b) a second register of the second pair that stores address data corresponding to a current memory address of the second memory region, the current memory address of the second memory region being contiguous with a previously written memory address of the second memory region;
   (III) control circuitry configured to
      (i) receive, from a first computing resource, a base memory address of a particular memory region, and first write data to be written in the particular memory region;
      (ii) search the first register of the first pair and the first register of the second pair, and,
      when the base memory address of the first memory region stored in the first register of the first pair matches the base memory address of the particular memory region, identify the particular memory region as the first memory region, or
      when the base memory address of the second memory region stored in the first register of the second pair matches the base memory address of the particular memory region, identify the particular memory region as the second memory region;
      (iii) write the first write data at the current memory address of the identified memory region based at least on the address data corresponding to the current memory address of the identified memory region; and
      (iv) update the address data in the second register of the pair corresponding to the identified memory region based on a size of the first write data written at the current memory address of the identified memory region.

2. The memory controller of claim 1, wherein
the address data stored in the second register of the first pair comprises a total size of write data contiguously written in the first memory region starting at the base memory address of the first memory region, and the address data stored in the second register of the second pair comprises a total size of write data contiguously written in the second memory region starting at the base memory address of the second memory region;
the first write data is packaged in a payload of a packet transmitted by the first computing resource, a header of the packet comprising the base memory address of the particular memory region; and
the control circuitry is further configured to calculate, upon identifying the particular memory region, the current memory address of the identified memory region as a sum of (a) the base memory address stored in the first register of the pair corresponding to the identified memory region and (b) the total size of write data stored in the second register of the pair corresponding to the identified memory region.

3. The memory controller of claim 1, wherein
the address data stored in the second register of the first pair comprises the current memory address of the first memory region, and the address data stored in the second register of the second pair comprises the current memory address of the second memory region;
the first write data is packaged in a payload of a packet transmitted by the first computing resource, a header of the packet comprising the base memory address of the particular memory region; and the control circuitry is further configured to retrieve, upon identifying the particular memory region, the current memory address of the identified memory region from the second register of the pair corresponding to the identified memory region.

4. The memory controller of claim 1, wherein the control circuitry is further configured to
   (v) receive, from a second computing resource after the first write data had been received from the first computing resource, the base memory address of the particular memory region and second write data to be written in the particular memory region; and
   (vi) delay writing the second write data until the address data stored in the second register of the pair corresponding to the particular memory region has been updated after the first write data had been dispatched for writing at the current memory address of the particular memory region.

5. The memory controller of claim 4, wherein the first and second computing resources, the memory controller and the memory are included in a computing system.

6. The memory controller of claim 1, wherein the memory comprises random access memory (RAM).

7. A method performed by a memory controller coupled with a memory, the memory comprising a first memory region and a second memory region, the memory being associated with a memory space and supporting random access to addresses of the memory space, and wherein the first memory region spans a first plurality of addresses of the memory space and the second memory region spans a second plurality of addresses of the memory space, wherein the memory controller comprises a first pair of registers corresponding to the first memory region and a second pair of registers corresponding to the second memory region, the method comprising:
   storing, in a first register of the first pair, a base memory address of the first memory region;
   storing, in a second register of the first pair, address data corresponding to a current memory address of the first memory region, the current memory address of the first memory region being contiguous with a previously written memory address of the first memory region;
   storing, in a first register of the second pair, a base memory address of the second memory region;
   storing, in a second register of the second pair, address data corresponding to a current memory address of the second memory region, the current memory address of the second memory region being contiguous with a previously written memory address of the second memory region;
   receiving, by the memory controller from a first computing resource, a base memory address of a particular memory region, and first write data to be written by the memory controller in the particular memory region;
   searching, by the memory controller, the first register of the first pair and the first register of the second pair, and,
   when the base memory address of the first memory region stored in the first register of the first pair matches the base memory address of the particular memory region, identifying the particular memory region as the first memory region, or
   when the base memory address of the second memory region stored in the first register of the second pair matches the base memory address of the particular memory region, identifying the particular memory region as the second memory region;
   writing the first write data at the current memory address of the identified memory region based at least on the address data corresponding to the current memory address; and
   updating, by the memory controller, the address data in the second register to update the current memory address based on a size of the first write data written at the current memory address of the identified memory region.

8. The method of claim 7, wherein
   the address data stored in the second register of the first pair comprises a total size of write data contiguously written in the first memory region starting at the base memory address of the first memory region, and the address data stored in the second register of the second pair comprises a total size of write data contiguously written in the second memory region starting at the base memory address of the second memory region;
   the first write data is packaged in a payload of a packet transmitted by the first computing resource, a header of the packet comprising the base memory address of the particular memory region; and
   the method further comprises calculating, by the memory controller upon identifying the particular memory region, the current memory address of the identified memory region as a sum of (a) the base memory address stored in the first register of the pair corresponding to the identified memory region and (b) the total size of write data stored in the second register of the pair corresponding to the identified memory region.

9. The method of claim 7, wherein
   the address data stored in the second register of the first pair comprises a total size of write data contiguously written in the first memory region starting at the base memory address of the first memory region, and the address data stored in the second register of the second pair comprises a total size of write data contiguously written in the second memory region starting at the base memory address of the second memory region;
   the first write data is packaged in a payload of a packet transmitted by the first computing resource, a header of the packet comprising the base memory address of the particular memory region; and
   the method further comprises retrieving, by the memory controller upon identifying the particular memory region, the current memory address of the identified memory region from the second register of the pair corresponding to the identified memory region.

10. The method of claim 7, further comprising:
    receiving, by the memory controller from a second computing resource after the first write data had been received from the first computing resource, the base memory address of the particular memory region and second write data to be written in the particular memory region; and
    delaying the writing of the second write data until the address data stored in the second register of the pair corresponding to the particular memory region has been updated after the first write data had been dispatched for writing at the current memory address of the particular memory region.

11. The method of claim 10, wherein the first and second computing resources, the memory controller and the memory are included in a computing system.

12. The method of claim 7, wherein the memory comprises random access memory (RAM).

13. A computing system comprising:
a plurality of processing engines;
a memory controller; and
memory coupled with the memory controller, the memory having an associated memory space and supporting random access to addresses of the memory space, the memory including a first memory region and a second memory region, each of the first and second memory regions spanning a respective plurality of addresses of the memory space,
wherein the memory controller comprises
(a) a first pair of registers corresponding to the first memory region;
(b) a second pair of registers corresponding to the second memory region; and
(c) control circuitry configured to
(i) store, in a first register of the first pair, a base memory address of the first memory region, and store, in a second register of the first pair, address data corresponding to a current memory address of the first memory region, the current memory address of the first memory region being contiguous with a previously written memory address of the first memory region;
(ii) store, in a first register of the second pair, a base memory address of the second memory region, and store, in a second register of the second pair, address data corresponding to a current memory address of the second memory region, the current memory address being contiguous with a previously written memory address of the second memory region;
(iii) receive, from a first processing engine from among the plurality of processing engines, a base memory address of a particular memory region, and first write data to be written in the particular memory region;
(iv) search the first register of the first pair and the first register of the second pair, and,
when the base memory address of the first memory region stored in the first register of the first pair matches the base memory address of the particular memory region, identify the particular memory region as the first memory region, or
when the base memory address of the second memory region stored in the first register of the second pair matches the base memory address of the particular memory region, identify the particular memory region as the second memory region;
(v) write the first write data at the current memory address of the identified memory region based at least on the address data corresponding to the current memory address of the identified memory region; and
(vi) update the address data in the second register of the pair corresponding to the identified memory region based on a size of the first write data written at the current memory address of the identified memory region.

14. The computing system of claim 13, wherein
the address data stored in the second register of the first pair comprises a total size of write data contiguously written in the first memory region starting at the base memory address of the first memory region, and the address data stored in the second register of the second pair comprises a total size of write data contiguously written in the second memory region starting at the base memory address of the second memory region;
the first write data is packaged in a payload of a packet transmitted by the first processing engine, a header of the packet comprises the base memory address of the particular memory region; and
the control circuitry is further configured to calculate, upon identifying the particular memory region, the current memory address of the identified memory region as a sum of (a) the base memory address stored in the first register of the pair corresponding to the identified memory region and (b) the total size of write data stored in the second register of the pair corresponding to the identified memory region.

15. The computing system of claim 13, wherein
the address data stored in the second register of the first pair comprises a total size of write data contiguously written in the first memory region starting at the base memory address of the first memory region, and the address data stored in the second register of the second pair comprises a total size of write data contiguously written in the second memory region starting at the base memory address of the second memory region;
the first write data is packaged in a payload of a packet transmitted by the first processing engine, a header of the packet comprises the base memory address of the particular memory region; and
the control circuitry is further configured to retrieve, upon identifying the particular memory region, the current memory address of the identified memory region from the second register of the pair corresponding to the identified memory region.

16. The computing system of claim 13, wherein the control circuitry is further configured to
(vii) receive, from a second processing engine from among the plurality of processing engines after the first write data had been received from the first processing engine, the base memory address of the particular memory region and second write data to be written in the particular memory region; and
(viii) delay writing the second write data until the address data has been updated after the first write data had been dispatched for writing at the current memory address of the particular memory region.

17. The computing system of claim 13, wherein at least a portion thereof that includes the memory controller and at least some of the plurality of processing engines is implemented as a system on a chip (SoC).

18. The computing system of claim 13, wherein the memory comprises random access memory (RAM).

19. The computing system of claim 13, wherein the memory comprises a solid state drive (SSD).

20. The computing system of claim 13, wherein at least one processing engine of the plurality of processing engines is implemented as a microprocessor, a microcontroller, a field programmable gate array (FPGA) or an application specific integrated circuit (ASIC).

* * * * *